United States Patent
Li et al.

(10) Patent No.: US 11,026,225 B2
(45) Date of Patent: Jun. 1, 2021

(54) SUBSLOT PHYSICAL DOWNLINK CONTROL CHANNEL MONITORING AND DOWNLINK PREEMPTION INDICATION

(71) Applicant: QUALCOMM Incorporated, San Diego, CA (US)

(72) Inventors: Chih-Ping Li, San Diego, CA (US);
Jing Jiang, San Diego, CA (US);
Wanshi Chen, San Diego, CA (US);
Heechoon Lee, San Diego, CA (US);
Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/449,826

(22) Filed: Jun. 24, 2019

(65) Prior Publication Data
US 2019/0394772 A1    Dec. 26, 2019

Related U.S. Application Data

(60) Provisional application No. 62/689,727, filed on Jun. 25, 2018.

(51) Int. Cl.
*H04W 72/04*    (2009.01)
*H04W 72/06*    (2009.01)
*H04W 76/27*    (2018.01)

(52) U.S. Cl.
CPC ..... *H04W 72/0446* (2013.01); *H04W 72/042* (2013.01); *H04W 72/06* (2013.01); *H04W 76/27* (2018.02)

(58) Field of Classification Search
CPC . H04W 72/0446; H04W 72/06; H04W 76/27; H04W 72/042; H04W 76/36;
(Continued)

(56) References Cited

U.S. PATENT DOCUMENTS 1,014,929 A1    12/2018    Damnjanovic et al.
2018/0035459 A1*    2/2018    Islam ............... H04W 74/04
(Continued)

FOREIGN PATENT DOCUMENTS

WO    WO-2018064360 A1    4/2018

OTHER PUBLICATIONS

Sequans Communications: "On Multiplexing of URLLC and eMBB in DL", 3GPP Draft; R1-1708954, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017, XP051274126, 6 Pages, Retrieved from the Internet: URL: http://www.3gpp.org/ftp/Meetings_3GPP_SYNC/RAN1/Docs/ [retrieved on May 14, 2017],sections 1-4; figure 1.
(Continued)

*Primary Examiner* — Mohamed A Kamara
(74) *Attorney, Agent, or Firm* — Holland & Hart LLP

(57) ABSTRACT

Methods, systems, and devices for wireless communications are described. A user equipment (UE) may receive multiple physical downlink control channels (PDCCHs) in one or more slots along with data traffic, where one of the PDCCHs includes a downlink preemption indication (DLPI) signifying that a portion of the data traffic was preempted. In some cases, the UE may monitor, within a same slot, for both the data traffic and an additional PDCCH carrying the DLPI and then transmit, within the same slot, a feedback message based on attempting to decode the data traffic, taking into account the DLPI. Additionally, the UE may receive the data traffic via a first service, where the DLPI indicates a second service preempts the first service. In some cases, the DLPI may be transmitted based on the UE being capable of processing the data traffic and transmitting the feedback message within the same slot.

30 Claims, 21 Drawing Sheets

(58) Field of Classification Search
CPC ... H04L 5/0064; H04L 5/0053; H04L 5/0055; H04L 5/0007; H04L 5/0044
See application file for complete search history.

(56) References Cited

U.S. PATENT DOCUMENTS

| | | | |
|---|---|---|---|
| 2018/0278368 A1* | 9/2018 | Kim | H04L 1/0058 |
| 2018/0279289 A1* | 9/2018 | Islam | H04L 5/0094 |
| 2020/0119895 A1* | 4/2020 | Choi | H04L 5/00 |
| 2020/0120645 A1* | 4/2020 | Park | H04W 72/0446 |
| 2020/0128558 A1* | 4/2020 | Lu | H04L 5/0055 |
| 2020/0128570 A1* | 4/2020 | Wong | H04W 72/1273 |
| 2020/0236732 A1* | 7/2020 | Liu | H04L 27/26 |

OTHER PUBLICATIONS

International Search Report and Written Opinion—PCT/US2019/038943—ISA/EPO—dated Aug. 19, 2019.
Sony: "Remaining issues in Pre-emption Indicator", 3GPP Draft; R1-1720463-REL-15 NR—Remaining Issues in PI V03, 3rd Generation Partnership Project (3GPP), Mobile Competence Centre ; 650, Route Des Lucioles; F-06921 Sophia-Antipolis Cedex ; France, vol. RAN WG1, No. Reno, USA; Nov. 27, 2017-Dec. 1, 2017, Nov. 18, 2017 (Nov. 18, 2017), XP051370015, 8 Pages, Retrieved from the Internet: URL:http://www.3gpp.org/ftp/tsg%5Fran/WG1%5FRL1/TSGR1%5F91/Docs/ [retrieved on Nov. 18, 2017], sections 1-3; figure 4.

* cited by examiner

US 11,026,225 B2

SUBSLOT PHYSICAL DOWNLINK CONTROL CHANNEL MONITORING AND DOWNLINK PREEMPTION INDICATION

CROSS REFERENCE

The present application for patent claims the benefit of U.S. Provisional Patent Application No. 62/689,727 by LI, et al., entitled "SUBSLOT PHYSICAL DOWNLINK CONTROL CHANNEL MONITORING AND DOWNLINK PREEMPTION INDICATION," filed Jun. 25, 2018, assigned to the assignee hereof, and expressly incorporated by reference herein.

BACKGROUND

The following relates generally to wireless communications, and more specifically to subslot physical downlink control channel (PDCCH) monitoring and downlink preemption indication (DLPI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications, multiple services may operate concurrently on a set of time and frequency resources. As such, a first service may be preempted by a second service, where the second service takes precedence and utilizes the set of time and frequency resources over the first service. For example, communications with reliability and latency requirements may preempt communications that do not have the same requirements. However, when receiving downlink communications that have been at least partially preempted by other communications, a UE may not properly decode the downlink communications. Efficient techniques are desired for improving the decoding process when downlink communications have been preempted.

SUMMARY

The described techniques relate to improved methods, systems, devices, and apparatuses that support subslot physical downlink control channel (PDCCH) monitoring and a downlink preemption indication (DLPI). Generally, the described techniques provide for a user equipment (UE) to receive a first PDCCH (e.g., or multiple first PDCCHs) in one slot, receive data traffic from a base station within the one slot, and then receiving one or more additional PDCCHs within the same slot but after the data traffic, where the one or more additional PDCCHs include a DLPI signifying that at least a portion of the data traffic was preempted. In some cases, the UE may monitor for the data traffic in physical downlink shared channels (PDSCHs) according to the first PDCCH(s). Accordingly, the UE may transmit a feedback message based on receiving the data traffic in the PDSCH and based on the DLPI indicating the preempted portion of the data traffic in the PDSCH, where the feedback message may also be transmitted within the same slot in which the data traffic and PDCCHs (e.g., including the DLPI) are received. For example, the UE may transmit the feedback message based on attempting to decode the PDSCH, where the DLPI indicates that a portion of the PDSCH was preempted.

In some cases, the UE may receive the data traffic via a first service, and the DLPI may indicate that a second service preempts the first service. For example, ultra-reliable low latency communication (URLLC) traffic (e.g., a second service) may preempt enhanced mobile broadband (eMBB) traffic (e.g., a first service), where the DLPI indicates the URLLC traffic has preempted the eMBB traffic. In some cases, the base station may transmit the DLPI based on an indication that the UE is capable of processing the data traffic and transmitting the feedback message within the slot. Additionally or alternatively, the UE may receive a first PDCCH in a first slot that identifies resources in an additional slot (e.g., subsequently occurring after the first slot) that the UE is to monitor for the data traffic in the PDSCHs, where the UE transmits the feedback message in the additional slot and the data traffic may be preempted.

A method of wireless communication at a UE is described. The method may include receiving a first PDCCH message in a slot, the first PDCCH message identifying PDSCH resources within the slot to be monitored by the UE for data traffic, monitoring for the data traffic in accordance with the first PDCCH message, receiving an additional PDCCH message within the slot, the additional PDCCH message arriving after the UE has started monitoring for the data traffic, the additional PDCCH message including a DLPI indicating that at least a portion of the data traffic was preempted, and transmitting, during the slot in which the first PDDCH message, the data traffic, and the additional PDCCH message are received, a feedback message associated with receipt of the data traffic.

An apparatus for wireless communication at a UE is described. The apparatus may include a processor, memory in electronic communication with the processor, and instructions stored in the memory. The instructions may be executable by the processor to cause the apparatus to receive a first PDCCH message in a slot, the first PDCCH message identifying PDSCH resources within the slot to be monitored by the UE for data traffic, monitor for the data traffic in accordance with the first PDCCH message, receive an additional PDCCH message within the slot, the additional PDCCH message arriving after the UE has started monitoring for the data traffic, the additional PDCCH message including a DLPI indicating that at least a portion of the data traffic was preempted, and transmit, during the slot in which the first PDDCH message, the data traffic, and the additional PDCCH message are received, a feedback message associated with receipt of the data traffic.

Another apparatus for wireless communication at a UE is described. The apparatus may include means for receiving a first PDCCH message in a slot, the first PDCCH message identifying PDSCH resources within the slot to be monitored by the UE for data traffic, monitoring for the data traffic in accordance with the first PDCCH message, receiving an additional PDCCH message within the slot, the additional PDCCH message arriving after the UE has started monitoring for the data traffic, the additional PDCCH message including a DLPI indicating that at least a portion of the data traffic was preempted, and transmitting, during the slot in which the first PDDCH message, the data traffic, and the additional PDCCH message are received, a feedback message associated with receipt of the data traffic.

A non-transitory computer-readable medium storing code for wireless communication at a UE is described. The code may include instructions executable by a processor to receive a first PDCCH message in a slot, the first PDCCH message identifying PDSCH resources within the slot to be monitored by the UE for data traffic, monitor for the data traffic in accordance with the first PDCCH message, receive an additional PDCCH message within the slot, the additional PDCCH message arriving after the UE has started monitoring for the data traffic, the additional PDCCH message including a DLPI indicating that at least a portion of the data traffic was preempted, and transmit, during the slot in which the first PDDCH message, the data traffic, and the additional PDCCH message are received, a feedback message associated with receipt of the data traffic.

Some examples of the method, apparatuses, and non-transitory computer-readable medium described herein may further include operations, features, means, or instructions for transmitting an indication that the UE may be capable of processing the data traffic within a processing time that facilitates transmission of the feedback message within the slot, where inclusion of the DLPI within the additional PDCCH message within the slot may be based on the UE being capable of processing the data traffic within the processing time.

Some examples of the method, apparatuses, and non-transitory computer-readable medium described herein may further include operations, features, means, or instructions for identifying that the UE may be to monitor the slot for the additional PDCCH message in accordance with a PDCCH monitoring configuration that indicates more than one PDCCH message monitoring occasions in non-consecutive symbols of the slot.

In some examples of the method, apparatuses, and non-transitory computer-readable medium described herein, identifying that the UE may be to monitor the slot for the additional PDCCH message may include operations, features, means, or instructions for receiving configurations of control resources sets, common search spaces, UE-specific search spaces, or a combination thereof via radio resource control (RRC) messaging, where the PDCCH monitoring configuration includes resources indicated by the configurations of control resource sets, common search spaces, UE-specific search spaces, or the combination thereof.

In some examples of the method, apparatuses, and non-transitory computer-readable medium described herein, identifying that the UE may be to monitor the slot for the additional PDCCH message may include operations, features, means, or instructions for identifying, from the PDCCH monitoring configuration, that monitoring for the additional PDCCH message may be to occur at a fixed time within the slot.

In some examples of the method, apparatuses, and non-transitory computer-readable medium described herein, identifying that the UE may be to monitor the slot for the additional PDCCH message may include operations, features, means, or instructions for identifying, from the PDCCH monitoring configuration, that monitoring for the additional PDCCH message may be to occur a fixed time after a PDSCH message in which the data traffic may be received.

Some examples of the method, apparatuses, and non-transitory computer-readable medium described herein may further include operations, features, means, or instructions for identifying, using the DLPI, one or more symbols of a PDSCH message carrying the data traffic that correspond to the portion of the data traffic that was preempted and attempting to decode the data traffic based on the identification of the one or more symbols of the PDSCH message that were preempted, where the feedback message indicates whether the data traffic was successfully decoded.

In some examples of the method, apparatuses, and non-transitory computer-readable medium described herein, identifying the one or more symbols of the PDSCH message that were preempted may include operations, features, means, or instructions for mapping bits of the DLPI symbols and frequency resources of the PDSCH message.

In some examples of the method, apparatuses, and non-transitory computer-readable medium described herein, the DLPI includes fewer bits than symbols of the PDSCH message, where at least one bit of the DLPI maps to two or more symbols of the PDSCH message.

In some examples of the method, apparatuses, and non-transitory computer-readable medium described herein, the DLPI includes as many bits as symbols of the PDSCH message, but where each bit of the DLPI maps to two or more symbols of a subband of the PDSCH message, the PDSCH message including a corresponding two or more subbands.

In some examples of the method, apparatuses, and non-transitory computer-readable medium described herein, receiving the additional PDCCH message within the slot may include operations, features, means, or instructions for receiving the additional PDCCH message while the UE may be still monitoring for the data traffic.

Some examples of the method, apparatuses, and non-transitory computer-readable medium described herein may further include operations, features, means, or instructions for receiving the data traffic via a first service, where the portion of the data traffic was preempted by a second service.

In some examples of the method, apparatuses, and non-transitory computer-readable medium described herein, the first service may be eMBB traffic, and the second service may be URLLC traffic.

A method of wireless communication at a base station is described. The method may include transmitting, to a UE, a first PDCCH message in a slot, the first PDCCH message identifying PDSCH resources on which data traffic is to be transmitted within the slot, transmitting the data traffic in accordance with the first PDCCH message, transmitting an additional PDCCH message within the slot, the additional PDCCH message being transmitted after transmission of the data traffic has started, the additional PDCCH message including a DLPI indicating that at least a portion of the data traffic was preempted, and receiving, from the UE and during the slot in which the first PDDCH message, the data traffic, and the additional PDCCH message are transmitted, a feedback message associated with receipt of the data traffic.

An apparatus for wireless communication at a base station is described. The apparatus may include a processor, memory in electronic communication with the processor, and instructions stored in the memory. The instructions may be executable by the processor to cause the apparatus to transmit, to a UE, a first PDCCH message in a slot, the first PDCCH message identifying PDSCH resources on which data traffic is to be transmitted within the slot, transmit the data traffic in accordance with the first PDCCH message, transmit an additional PDCCH message within the slot, the additional PDCCH message being transmitted after transmission of the data traffic has started, the additional PDCCH message including a DLPI indicating that at least a portion of the data traffic was preempted, and receive, from the UE and during the slot in which the first PDDCH message, the data traffic, and the additional PDCCH message are transmitted, a feedback message associated with receipt of the data traffic.

Another apparatus for wireless communication at a base station is described. The apparatus may include means for transmitting, to a UE, a first PDCCH message in a slot, the first PDCCH message identifying PDSCH resources on which data traffic is to be transmitted within the slot, transmitting the data traffic in accordance with the first PDCCH message, transmitting an additional PDCCH message within the slot, the additional PDCCH message being transmitted after transmission of the data traffic has started, the additional PDCCH message including a DLPI indicating that at least a portion of the data traffic was preempted, and receiving, from the UE and during the slot in which the first PDDCH message, the data traffic, and the additional PDCCH message are transmitted, a feedback message associated with receipt of the data traffic.

A non-transitory computer-readable medium storing code for wireless communication at a base station is described. The code may include instructions executable by a processor to transmit, to a UE, a first PDCCH message in a slot, the first PDCCH message identifying PDSCH resources on which data traffic is to be transmitted within the slot, transmit the data traffic in accordance with the first PDCCH message, transmit an additional PDCCH message within the slot, the additional PDCCH message being transmitted after transmission of the data traffic has started, the additional PDCCH message including a DLPI indicating that at least a portion of the data traffic was preempted, and receive, from the UE and during the slot in which the first PDDCH message, the data traffic, and the additional PDCCH message are transmitted, a feedback message associated with receipt of the data traffic.

Some examples of the method, apparatuses, and non-transitory computer-readable medium described herein may further include operations, features, means, or instructions for receiving an indication that the UE may be capable of processing the data traffic within a processing time that facilitates transmission of the feedback message within the slot, where inclusion of the DLPI within the additional PDCCH message within the slot may be based on the UE being capable of processing the data traffic within the processing time.

In some examples of the method, apparatuses, and non-transitory computer-readable medium described herein, transmitting the additional PDCCH message within the slot further may include operations, features, means, or instructions for identifying a PDCCH monitoring configuration that indicates more than one PDCCH message monitoring occasions in non-consecutive symbols of the slot, where the additional PDCCH message may be transmitted in accordance with the PDCCH monitoring configuration.

Some examples of the method, apparatuses, and non-transitory computer-readable medium described herein may further include operations, features, means, or instructions for transmitting configurations of control resources sets, common search spaces, UE-specific search spaces, or a combination thereof via radio resource control (RRC) messaging, where the PDCCH monitoring configuration includes resources indicated by the configurations of control resource sets, common search spaces, UE-specific search spaces, or the combination thereof.

In some examples of the method, apparatuses, and non-transitory computer-readable medium described herein, identifying the PDCCH monitoring configuration further may include operations, features, means, or instructions for identifying, from the PDCCH monitoring configuration, that the additional PDCCH message may be to be transmitted at a fixed time within the slot.

In some examples of the method, apparatuses, and non-transitory computer-readable medium described herein, identifying the PDCCH monitoring configuration further may include operations, features, means, or instructions for identifying, from the PDCCH monitoring configuration, that the additional PDCCH message may be to be transmitted at a fixed time after transmission of a PDSCH message which includes the data traffic may be completed.

Some examples of the method, apparatuses, and non-transitory computer-readable medium described herein may further include operations, features, means, or instructions for identifying, using the DLPI, one or more symbols of a PDSCH message carrying the data traffic that correspond to the portion of the data traffic that was preempted.

In some examples of the method, apparatuses, and non-transitory computer-readable medium described herein, identifying the one or more symbols of the PDSCH message that were preempted may include operations, features, means, or instructions for mapping bits of the DLPI to symbols and frequency resources of the PDSCH message.

In some examples of the method, apparatuses, and non-transitory computer-readable medium described herein, the DLPI includes fewer bits than symbols of the PDSCH message, where at least one bit of the DLPI maps to two or more symbols of the PDSCH message.

In some examples of the method, apparatuses, and non-transitory computer-readable medium described herein, the DLPI includes as many bits as symbols of the PDSCH message, but where each bit of the DLPI maps to two or more symbols of a subband of the PDSCH message, the PDSCH message including a corresponding two or more subbands.

In some examples of the method, apparatuses, and non-transitory computer-readable medium described herein, transmitting the additional PDCCH message within the slot may include operations, features, means, or instructions for transmitting the additional PDCCH message while still transmitting the data traffic.

Some examples of the method, apparatuses, and non-transitory computer-readable medium described herein may further include operations, features, means, or instructions for transmitting the data traffic via a first service, where the portion of the data traffic was preempted by a second service.

In some examples of the method, apparatuses, and non-transitory computer-readable medium described herein, the first service may be eMBB traffic, and the second service may be URLLC traffic.

A method of wireless communications at a UE is described. The method may include receiving a first PDCCH message in a first slot, the first PDCCH message identifying PDSCH resources within an additional slot to be monitored by the UE for data traffic, monitoring for the data traffic in the additional slot in accordance with the first PDCCH message, receiving an additional PDCCH message within the additional slot, the additional PDCCH message arriving after the UE has started monitoring for the data traffic, the additional PDCCH message including a DLPI indicating that at least a portion of the data traffic was preempted, and transmitting, during the additional slot in which the data traffic and the additional PDCCH message are received, a feedback message associated with receipt of the data traffic.

An apparatus for wireless communications at a UE is described. The apparatus may include a processor, memory in electronic communication with the processor, and instructions stored in the memory. The instructions may be executable by the processor to cause the apparatus to receive a first PDCCH message in a first slot, the first PDCCH message identifying PDSCH resources within an additional slot to be monitored by the UE for data traffic, monitor for the data traffic in the additional slot in accordance with the first PDCCH message, receive an additional PDCCH message within the additional slot, the additional PDCCH message arriving after the UE has started monitoring for the data traffic, the additional PDCCH message including a DLPI indicating that at least a portion of the data traffic was preempted, and transmit, during the additional slot in which the data traffic and the additional PDCCH message are received, a feedback message associated with receipt of the data traffic.

Another apparatus for wireless communications at a UE is described. The apparatus may include means for receiving a first PDCCH message in a first slot, the first PDCCH message identifying PDSCH resources within an additional slot to be monitored by the UE for data traffic, monitoring for the data traffic in the additional slot in accordance with the first PDCCH message, receiving an additional PDCCH message within the additional slot, the additional PDCCH message arriving after the UE has started monitoring for the data traffic, the additional PDCCH message including a DLPI indicating that at least a portion of the data traffic was preempted, and transmitting, during the additional slot in which the data traffic and the additional PDCCH message are received, a feedback message associated with receipt of the data traffic.

A non-transitory computer-readable medium storing code for wireless communications at a UE is described. The code may include instructions executable by a processor to receive a first PDCCH message in a first slot, the first PDCCH message identifying PDSCH resources within an additional slot to be monitored by the UE for data traffic, monitor for the data traffic in the additional slot in accordance with the first PDCCH message, receive an additional PDCCH message within the additional slot, the additional PDCCH message arriving after the UE has started monitoring for the data traffic, the additional PDCCH message including a DLPI indicating that at least a portion of the data traffic was preempted, and transmit, during the additional slot in which the data traffic and the additional PDCCH message are received, a feedback message associated with receipt of the data traffic.

Some examples of the method, apparatuses, and non-transitory computer-readable medium described herein may further include operations, features, means, or instructions for transmitting an indication that the UE may be capable of processing the data traffic within a processing time that facilitates transmission of the feedback message within the additional slot, where inclusion of the DLPI within the additional PDCCH message within the additional slot may be based on the UE being capable of processing the data traffic within the processing time.

Some examples of the method, apparatuses, and non-transitory computer-readable medium described herein may further include operations, features, means, or instructions for identifying that the UE may be to monitor the additional slot for the additional PDCCH message in accordance with a PDCCH monitoring configuration that indicates more than one PDCCH message monitoring occasions in non-consecutive symbols of the additional slot.

In some examples of the method, apparatuses, and non-transitory computer-readable medium described herein, identifying that the UE may be to monitor the additional slot for the additional PDCCH message may include operations, features, means, or instructions for receiving configurations of control resources sets, common search spaces, UE-specific search spaces, or a combination thereof via RRC messaging, where the PDCCH monitoring configuration includes resources indicated by the configurations of control resource sets, common search spaces, UE-specific search spaces, or the combination thereof.

In some examples of the method, apparatuses, and non-transitory computer-readable medium described herein, identifying that the UE may be to monitor the additional slot for the additional PDCCH message may include operations, features, means, or instructions for identifying, from the PDCCH monitoring configuration, that monitoring for the additional PDCCH message may be to occur at a fixed time within the additional slot.

In some examples of the method, apparatuses, and non-transitory computer-readable medium described herein, identifying that the UE may be to monitor the additional slot for the additional PDCCH message may include operations, features, means, or instructions for identifying, from the PDCCH monitoring configuration, that monitoring for the additional PDCCH message may be to occur a fixed time after a PDSCH message in which the data traffic may be received.

Some examples of the method, apparatuses, and non-transitory computer-readable medium described herein may further include operations, features, means, or instructions for identifying, using the DLPI, one or more symbols of a PDSCH message carrying the data traffic that correspond to the portion of the data traffic that was preempted and attempting to decode the data traffic based on the identification of the one or more symbols of the PDSCH message that were preempted, where the feedback message indicates whether the data traffic was successfully decoded.

In some examples of the method, apparatuses, and non-transitory computer-readable medium described herein, identifying the one or more symbols of the PDSCH message that were preempted may include operations, features, means, or instructions for mapping bits of the DLPI to symbols and frequency resources of the PDSCH message.

In some examples of the method, apparatuses, and non-transitory computer-readable medium described herein, the DLPI includes fewer bits than symbols of the PDSCH message, where at least one bit of the DLPI maps to two or more symbols of the PDSCH message.

In some examples of the method, apparatuses, and non-transitory computer-readable medium described herein, the DLPI includes as many bits as symbols of the PDSCH message, but where each bit of the DLPI maps to two or more symbols of a subband of the PDSCH message, the PDSCH message including a corresponding two or more subbands.

In some examples of the method, apparatuses, and non-transitory computer-readable medium described herein, receiving the additional PDCCH message within the additional slot may include operations, features, means, or instructions for receiving the additional PDCCH message while the UE may be still monitoring for the data traffic.

Some examples of the method, apparatuses, and non-transitory computer-readable medium described herein may further include operations, features, means, or instructions for receiving the data traffic via a first service, where the portion of the data traffic was preempted by a second service.

In some examples of the method, apparatuses, and non-transitory computer-readable medium described herein, the first service may be eMBB traffic, and the second service may be URLLC traffic.

A method of wireless communications at a base station is described. The method may include transmitting, to a UE, a first PDCCH message in a first slot, the first PDCCH message identifying PDSCH resources on which data traffic is to be transmitted within an additional slot, transmitting the data traffic in the additional slot in accordance with the first PDCCH message, transmitting an additional PDCCH message within the additional slot, the additional PDCCH message being transmitted after transmission of the data traffic has started, the additional PDCCH message including a DLPI indicating that at least a portion of the data traffic was preempted, and receiving, from the UE and during the additional slot in which the data traffic and the additional PDCCH message are transmitted, a feedback message associated with receipt of the data traffic.

An apparatus for wireless communications at a base station is described. The apparatus may include a processor, memory in electronic communication with the processor, and instructions stored in the memory. The instructions may be executable by the processor to cause the apparatus to transmit, to a UE, a first PDCCH message in a first slot, the first PDCCH message identifying PDSCH resources on which data traffic is to be transmitted within an additional slot, transmit the data traffic in the additional slot in accordance with the first PDCCH message, transmit an additional PDCCH message within the additional slot, the additional PDCCH message being transmitted after transmission of the data traffic has started, the additional PDCCH message including a DLPI indicating that at least a portion of the data traffic was preempted, and receive, from the UE and during the additional slot in which the data traffic and the additional PDCCH message are transmitted, a feedback message associated with receipt of the data traffic.

Another apparatus for wireless communications at a base station is described. The apparatus may include means for transmitting, to a UE, a first PDCCH message in a first slot, the first PDCCH message identifying PDSCH resources on which data traffic is to be transmitted within an additional slot, transmitting the data traffic in the additional slot in accordance with the first PDCCH message, transmitting an additional PDCCH message within the additional slot, the additional PDCCH message being transmitted after transmission of the data traffic has started, the additional PDCCH message including a DLPI indicating that at least a portion of the data traffic was preempted, and receiving, from the UE and during the additional slot in which the data traffic and the additional PDCCH message are transmitted, a feedback message associated with receipt of the data traffic.

A non-transitory computer-readable medium storing code for wireless communications at a base station is described. The code may include instructions executable by a processor to transmit, to a UE, a first PDCCH message in a first slot, the first PDCCH message identifying PDSCH resources on which data traffic is to be transmitted within an additional slot, transmit the data traffic in the additional slot in accordance with the first PDCCH message, transmit an additional PDCCH message within the additional slot, the additional PDCCH message being transmitted after transmission of the data traffic has started, the additional PDCCH message including a DLPI indicating that at least a portion of the data traffic was preempted, and receive, from the UE and during the additional slot in which the data traffic and the additional PDCCH message are transmitted, a feedback message associated with receipt of the data traffic.

Some examples of the method, apparatuses, and non-transitory computer-readable medium described herein may further include operations, features, means, or instructions for receiving an indication that the UE may be capable of processing the data traffic within a processing time that facilitates transmission of the feedback message within the additional slot, where inclusion of the DLPI within the additional PDCCH message within the additional slot may be based on the UE being capable of processing the data traffic within the processing time.

In some examples of the method, apparatuses, and non-transitory computer-readable medium described herein, transmitting the additional PDCCH message within the additional slot further may include operations, features, means, or instructions for identifying a PDCCH monitoring configuration that indicates more than one PDCCH message monitoring occasions in non-consecutive symbols of the additional slot, where the additional PDCCH message may be transmitted in accordance with the PDCCH monitoring configuration.

Some examples of the method, apparatuses, and non-transitory computer-readable medium described herein may further include operations, features, means, or instructions for transmitting configurations of control resources sets, common search spaces, UE-specific search spaces, or a combination thereof via RRC messaging, where the PDCCH monitoring configuration includes resources indicated by the configurations of control resource sets, common search spaces, UE-specific search spaces, or the combination thereof.

In some examples of the method, apparatuses, and non-transitory computer-readable medium described herein, identifying the PDCCH monitoring configuration further may include operations, features, means, or instructions for identifying, from the PDCCH monitoring configuration, that the additional PDCCH message may be to be transmitted at a fixed time within the additional slot.

In some examples of the method, apparatuses, and non-transitory computer-readable medium described herein, identifying the PDCCH monitoring configuration further may include operations, features, means, or instructions for identifying, from the PDCCH monitoring configuration, that the additional PDCCH message may be to be transmitted at a fixed time after transmission of a PDSCH message which includes the data traffic may be completed.

Some examples of the method, apparatuses, and non-transitory computer-readable medium described herein may further include operations, features, means, or instructions for identifying, using the DLPI, one or more symbols of a PDSCH message carrying the data traffic that correspond to the portion of the data traffic that was preempted.

In some examples of the method, apparatuses, and non-transitory computer-readable medium described herein, identifying the one or more symbols of the PDSCH message that were preempted may include operations, features, means, or instructions for mapping bits of the DLPI to symbols and frequency resources of the PDSCH message.

In some examples of the method, apparatuses, and non-transitory computer-readable medium described herein, the DLPI includes fewer bits than symbols of the PDSCH message, where at least one bit of the DLPI maps to two or more symbols of the PDSCH message.

In some examples of the method, apparatuses, and non-transitory computer-readable medium described herein, the DLPI includes as many bits as symbols of the PDSCH message, but where each bit of the DLPI maps to two or more symbols of a subband of the PDSCH message, the PDSCH message including a corresponding two or more subbands.

In some examples of the method, apparatuses, and non-transitory computer-readable medium described herein, transmitting the additional PDCCH message within the additional slot may include operations, features, means, or instructions for transmitting the additional PDCCH message while still transmitting the data traffic.

Some examples of the method, apparatuses, and non-transitory computer-readable medium described herein may further include operations, features, means, or instructions for transmitting the data traffic via a first service, where the portion of the data traffic was preempted by a second service.

In some examples of the method, apparatuses, and non-transitory computer-readable medium described herein, the first service may be eMBB traffic, and the second service may be URLLC traffic.

DETAILED DESCRIPTION

Figure 1:
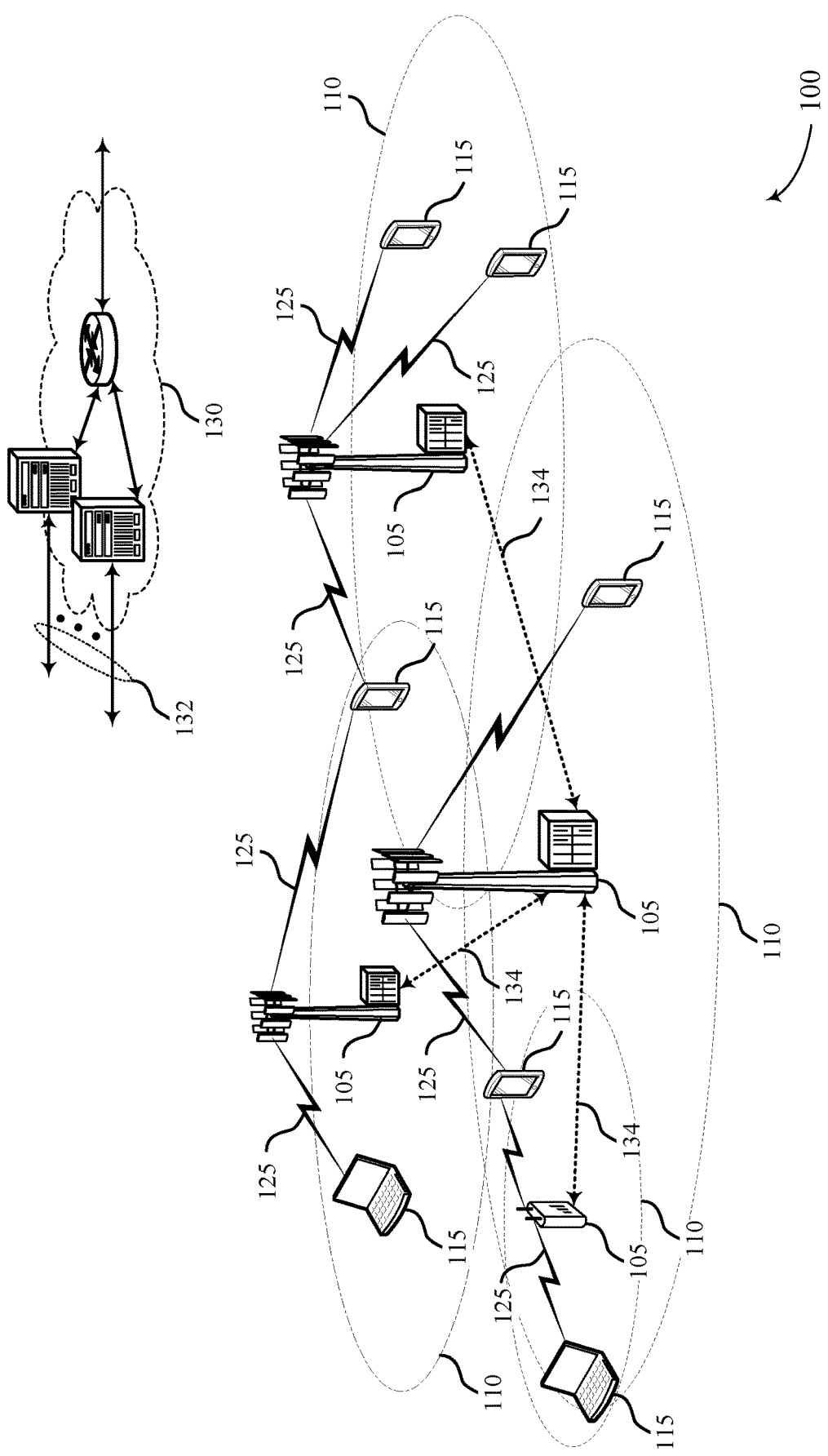
FIG. 1 illustrates an example of a system for wireless communications that supports subslot physical downlink control channel (PDCCH) monitoring and a downlink preemption indication (DLPI) in accordance with aspects of the present disclosure.

A user equipment (UE) may receive a physical downlink control channel (PDCCH) from a base station that indicates whether subsequent communications on resources of a physical downlink shared channel (PDSCH) are intended for the UE. For example, the UE may receive the PDCCH in up to three (3) consecutive orthogonal frequency division multiplexed (OFDM) symbols that have fixed positions in each slot periodicity of 14 or more symbols. In some cases, the up to three (3) consecutive OFDM symbols may occur at the beginning of a given slot or span up to any three (3) consecutive OFDM symbols of a given slot. Additionally or alternatively, the UE may receive the PDCCH in other symbols in a given slot. For example, the UE may receive multiple PDCCHs distributed throughout the slot, or the UE may receive the PDCCH in non-consecutive OFDM symbols in the slot. The UE may then monitor for data traffic on the resources of the PDSCH based on the received PDCCH(s), where the PDCCHs indicate the resources to monitor. In some cases, the PDCCHs that indicate the resources to monitor may be received in a first slot prior to an additional slot (e.g., subsequent slot) for receiving the data traffic on the resources of the PDSCH.

Additionally, as described herein. the base station may transmit a downlink preemption indication (DLPI) to inform the UE that resources allocated to the UE were preempted for communications with a higher priority than the communications between the base station and UE. For example, a first PDCCH may indicate resources allocated for the UE in a first PDSCH, and the UE may monitor the PDSCH and receive data traffic on the indicated resources for a first service. However, communications associated with a second service may preempt the first service, and, accordingly, the base station may transmit the DLPI in a subsequent PDCCH (e.g., in a consecutive slot) after the PDSCH to indicate at least a portion of the previously received data traffic for the first service was preempted by the second service. Based on receiving the DLPI, the UE may attempt to decode the data traffic received in the PDSCH taking into account the preempted portion of the data traffic. The UE may then transmit a feedback message based on whether the data traffic is successfully decoded.

When multiple PDCCHs are received within a single slot, the base station may transmit the DLPI within the same slot, where the DLPI maps to n bits within the slot. In some cases, n may equal the time (m) between two (2) PDCCHs or twice the time (2m) between two (2) PDCCHs. Additionally, the PDCCH carrying the DLPI may occur a fixed time after the end of the PDSCH, and n may be equal to a multiple (N) of the time duration of the PDSCH (e.g., N=1, 2). By transmitting the DLPI to the UE via an additional PDCCH of the same slot, the base station may enable the UE to more efficiently decode the data traffic received in the PDSCH and may be able to provide feedback regarding the receipt and decoding of the data traffic during the same slot (e.g., at the end of the slot).

Aspects of the disclosure are initially described in the context of a wireless communications system. An additional wireless communications system, examples of slot structures, and a process flow are then provided to describe aspects of the disclosure. Aspects of the disclosure are further illustrated by and described with reference to apparatus diagrams, system diagrams, and flowcharts that relate to subslot PDCCH monitoring and a DLPI.

FIG. 1 illustrates an example of a wireless communications system 100 that supports subslot PDCCH monitoring and DLPI in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may receive a slot level PDCCH from a base station 105 that indicates PDSCH resources for the UE 115 to monitor for data traffic. For example, the UE 115 may receive one PDCCH per slot duration (e.g., 14 or more OFDM symbols) at the beginning of the slot that indicates a set of PDSCH resources to monitor in the same slot. In some cases, the UE 115 may monitor for and receive the PDCCH in up to three (3) consecutive OFDM symbols that have fixed positions in each slot periodicity within all search space sets that are monitored in a slot, where the up to three (3) consecutive OFDM symbols occur at the beginning of the slot or any span of up to three (3) consecutive OFDM symbols of the slot. For a given UE 115, all search space configurations may be within the same span of three (3) consecutive OFDM symbols in the slot. Additionally or alternatively, the UE 115 may monitor for and receive multiple PDCCHs in different OFDM symbols. For example, the UE 115 may monitor for and receive the multiple PDCCHs in non-consecutive symbols, distributed across the slot, or a combination thereof, which may include the monitoring for and receiving the PDCCH in the first (3) OFDM symbols of the slot as described above. At the end of the slot, the UE 115 may transmit a feedback message (e.g., an acknowledgement/negative acknowledgement (ACK/NACK) message) based on processing previously received data traffic (e.g., in the same slot or a preceding slot).

However, as described herein, at least a portion of the data traffic may be preempted by a service that has a higher priority than a service associated with the data traffic, thereby affecting the processing of the previously received data. When receiving downlink communications that have been at least partially preempted by other communications, a UE 115 may not properly decode the downlink communications if the UE 115 is not aware that the downlink communications were at least partially preempted. As such, the base station 105 may transmit a slot level DLPI in a subsequent PDCCH at the beginning of the next occurring slot, where the DLPI indicates which resources were preempted by the higher priority service. The UE 115 may then take the DLPI into account when processing the data traffic and may transmit the feedback message in the next occurring slot that the subsequent PDCCH is received. In some cases, based on a processing capability of the UE 115, the base station 105 may transmit multiple PDCCHs in one slot, where a first PDCCH indicates PDSCH resources to monitor for data traffic and at least a portion of the data traffic is preempted by a separate service. However, current systems may only transmit DLPI in a subsequent slot to the preempted data traffic, and, as such, the UE 115 may not properly decode the data traffic within the same slot as the preempted data traffic. For example, even with the DLPI, the UE 115 may not receive the DLPI in sufficient time to allow for same-slot decoding of the downlink communications.

Wireless communications system 100 may support efficient techniques for indicating preempted data traffic within a same slot as the data traffic is received and transmitting a corresponding feedback message in that same slot. For example, a base station 105 may include a DLPI in an additional subslot PDCCH transmitted in the slot after transmitting a first subslot PDCCH indicating the resources to monitor for data traffic in a PDSCH. The DLPI may include n bits, where each bit maps to one symbol across an active bandwidth part for the data traffic received in the PDSCH. The number of bits may be greater than or equal to the time duration (m) between the first subslot PDCCH and the additional subslot PDCCH. For example, n may be equal to the time duration or twice the time duration (e.g., n=m or 2m). Additionally, the additional PDCCH carrying the DLPI may semi-statically occur a fixed time after the end of the PDSCH with the preempted data traffic. In some cases, the number of bits for the DLPI may further equal a multiple (N) of the time duration for the PDSCH (e.g., N, 2N, etc.), and the additional PDCCH carrying the DLPI may be UE-specific. Additionally or alternatively, the UE 115 may receive a first PDCCH in a first slot that identifies resources in an additional slot that the UE 115 is to monitor for the data traffic in the PDSCHs, where the UE 115 transmits the feedback message in the additional slot taking into account that the data traffic may have been preempted.

Figure 2:
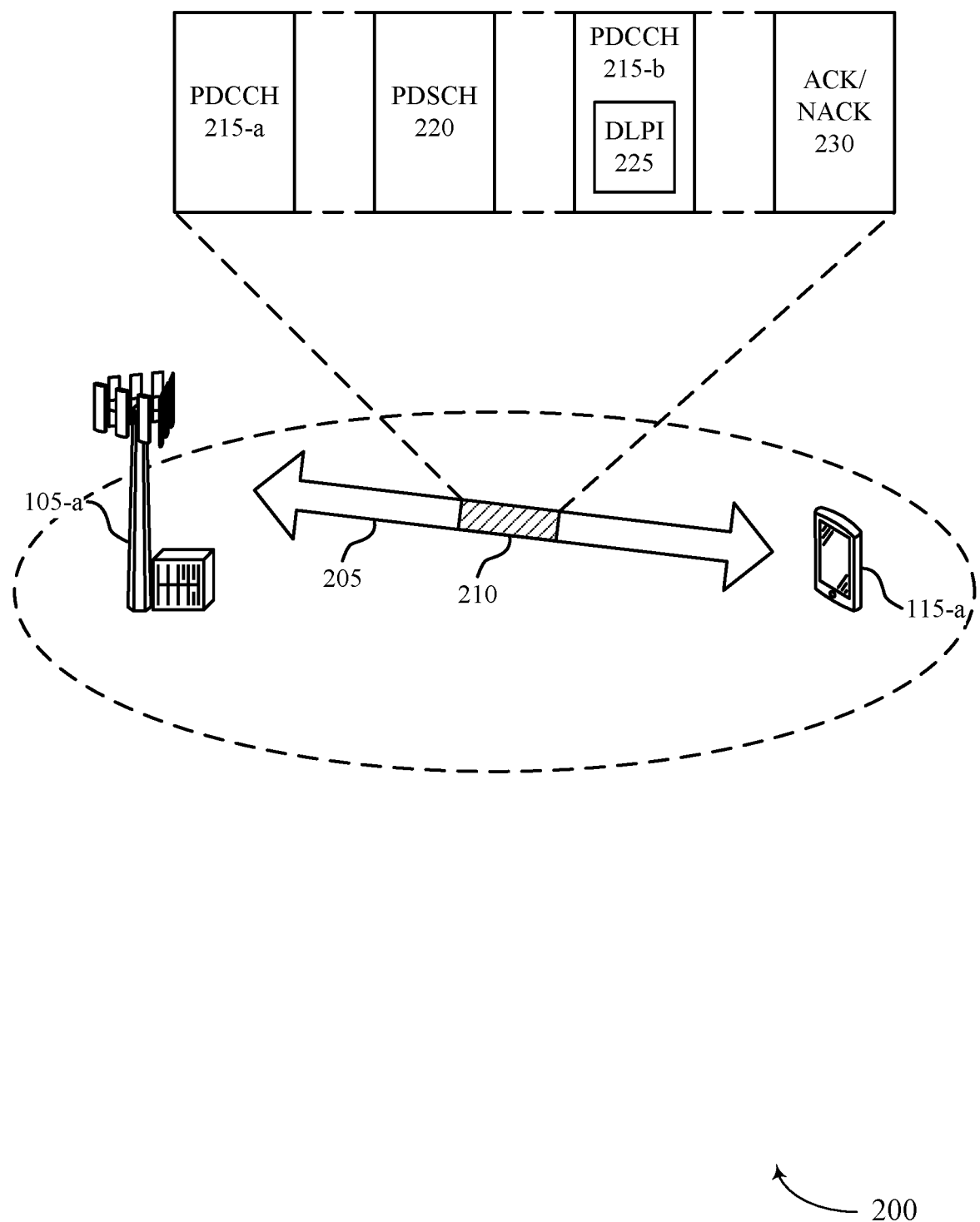
FIG. 2 illustrates an example of a wireless communications system that supports sub slot PDCCH monitoring and a DLPI in accordance with aspects of the present disclosure.

FIG. 2 illustrates an example of a wireless communications system 200 that supports subslot PDCCH monitoring and a DLPI in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115, respectively, as described above with reference to FIG. 1. In some cases, base station 105-*a* and UE 115-*a* may communicate on resources of a carrier 205 and, in particular, on a slot 210 of carrier 205. Additionally, UE 115-*a* may be capable of processing data traffic received within slot 210 and transmitting a feedback message also within slot 210. As such, base station 105-*a* may transmit multiple PDCCHs 215 to UE 115-*a* based on the processing capability.

UE 115-*a* may first receive a PDCCH 215-*a* at the beginning of slot 210. For example, UE 115-*a* may monitor for and receive PDCCH 215-*a* within the first three (3) consecutive OFDM symbols of slot 210 (e.g., or any three (3) consecutive or non-consecutive OFDM symbols in slot 210). PDCCH 215-*a* may indicate resources of a PDSCH 220 for UE 115-*a* to monitor for data traffic intended for it. In some cases, PDCCH 215-*a* may also indicate for UE 115-*a* to monitor for a PDCCH 215-*b* (e.g., an additional PDCCH) in slot 210. Additionally or alternatively, UE 115-*a* may monitor for PDCCH 215-*b* based on higher layer signaling (e.g., RRC configuration) for configurations of control resource sets, search spaces, or a combination thereof. In either case (e.g., via PDCCH 215-*a* or via higher layer signaling), the indication to monitor for PDCCH 215-*b* may include a configuration of resources indicated for PDCCH 215-*b* (e.g., control resources sets, common search spaces, UE-specific search spaces, etc.). In some cases, base station 105-*b* may configure PDCCH 215-*b* to occur at a fixed time after the end of PDSCH 220. For example, the fixed time (e.g., location) of PDCCH 215-*b* after the end of PDSCH 220 may be configured by higher layer signaling (e.g., RRC configuration) or indicated in PDCCH 215-*a*.

During PDSCH 220, UE 115-*a* may receive data traffic associated with a first service (e.g., eMBB traffic). However, as described herein, a second service (e.g., URLLC traffic) may take priority over the first service and preempt at least a portion of the data traffic, but UE 115-*a* may not recognize that the portion of the data traffic was preempted by the second service. As such, when attempting to decode the data traffic, UE 115-*a* may incorrectly decode the data traffic based on the preempted portion. To mitigate this decoding issue, base station 105-*a* may transmit a DLPI 225 in PDCCH 215-*b* that indicates the resources of PDSCH 220 preempted by the second service. For example, DLPI 225 may include n bits, where each bit maps to one symbol across an active bandwidth part of PDSCH 220. Additionally or alternatively, each bit of DLPI 225 may map to a resource region of x symbols and a subband in PDSCH 220, where the subband may be an entire active bandwidth part. The number of bits may be greater than or equal to the time duration (m) between PDCCH 215-*a* and PDCCH 215-*b*. For example, n may be equal to the time duration or twice the time duration (e.g., n=m or 2m). In some cases, the number of bits for DLPI 225 may further equal a multiple (N) of the time duration for PDSCH 220 (e.g., N, 2N, etc.), where PDSCH 220 includes two (2) or more subbands. Additionally, DLPI 225 may include a given size, where zero-padding may be implemented after the bits of DLPI 225 in order to match the given size (e.g., zeroes may be appended to the end of the bits for DLPI 225 to match a predetermined size for DLPI 225). In some cases, DLPI 225 may be specific to UE 115-*a*, where PDCCH 215-*b* may be UE-specific transmission from base station 105-*a*. Additionally or alternatively, DLPI 225 may be carried in a group common PDCCH 215 (e.g., PDCCH 215-*b*), such that DLPI 225 may be applied to one UE 115 or a group of UEs 115.

Based on DLPI 225, UE 115-*a* may decode PDSCH 220 by taking into account the preempted portion of data traffic. Accordingly, UE 115-*a* may then transmit an ACK/NACK 230 (e.g., feedback message) based on if PDSCH 220 is successfully decoded or not (e.g., the data traffic including the preempted portion). For example, ACK/NACK 230 may include an ACK message if PDSCH 220 (e.g., the data traffic in PDSCH 220) is successfully decoded (e.g., including the preempted portion) or may include a NACK message if PDSCH 220 is unsuccessfully decoded (e.g., the data traffic is not successfully decoded based on the preempted portion or some additional interference). If a NACK message is received from ACK/NACK 230 or no response is received in ACK/NACK 230, base station 105-*a* may attempt a retransmission, adjust transmission parameters, or perform a similar mitigation technique to support communications with UE 115-*a*.

In some cases, UE 115-*a* may receive PDCCH 215-*a* in a first slot that indicates resources of PDSCH 220 to monitor for the data traffic are located in an additional slot (e.g., subsequent occurring slot). As described above, PDCCH 215-*b* and DLPI 225 may be received in the same additional slot as PDSCH 220 and the data traffic, and UE 115-*a* may also transmit ACK/NACK 230 in the same additional slot as PDSCH 220 (e.g., including the data traffic), PDCCH 215-*b*, and DLPI 225.

Figure 3:
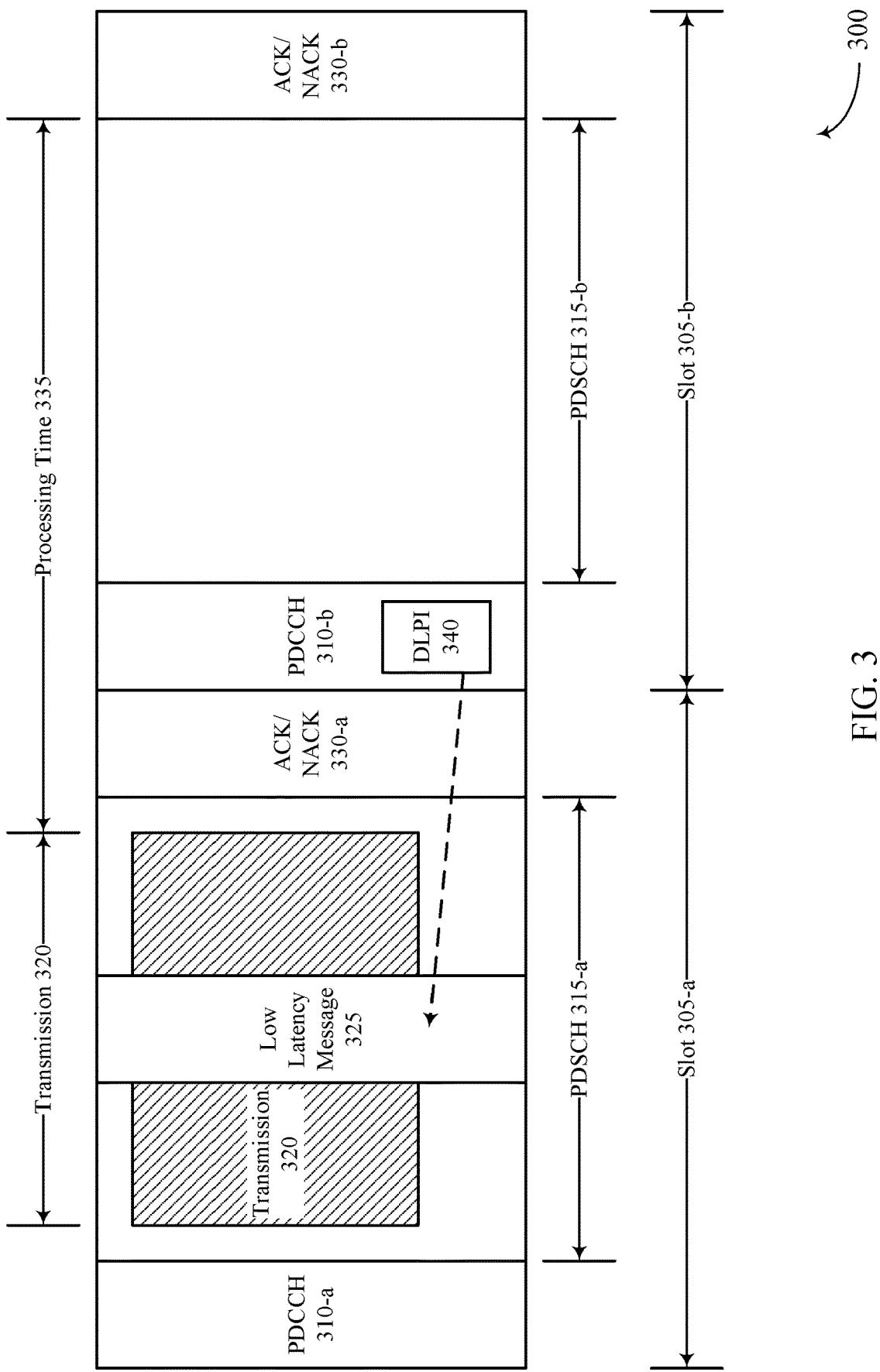
FIG. 3 illustrates an example of a slot structure that supports slot-level PDCCH monitoring and a DLPI in accordance with aspects of the present disclosure.

FIG. 3 illustrates an example of a slot structure 300 that supports slot-level PDCCH monitoring and a DLPI in accordance with aspects of the present disclosure. In some examples, slot structure 300 may implement aspects of wireless communications systems 100 and/or 200. In some cases, a base station 105 may transmit multiple PDCCHs 310 to a UE 115 in respective slots 305 according to slot structure 300. For example, each slot 305 may include one slot-level PDCCH 310. Accordingly, the UE 115 may monitor for and receive the slot-level PDCCH 310 by monitoring all search space sets in each slot 305 within up to three (3) consecutive OFDM symbols, where the consecutive OFDM symbols have fixed positions in each slot periodicity (e.g., 14 or more OFDM symbols). For example, the UE 115 may perform this PDCCH monitoring on up to three (3) OFDM symbols at the beginning of a slot 305 or on any span of up to three (3) OFDM symbols of the slot 305. For a given UE 115, all search space configurations may be within the same span of three (3) consecutive OFDM symbols in the slot 305.

As shown in slot structure 300, the UE 115 may receive PDCCH 310-*a* based on monitoring up to three (3) consecutive OFDM symbols of slot 305-*a* (e.g., at the beginning of slot 305-*a* or any span of up to three (3) consecutive symbols of slot 305-*a*). PDCCH 310-*a* may indicate resources of a PDSCH 315-*a* that the UE 115 is to monitor for a transmission 320 associated with a first service (e.g., eMBB traffic), and, accordingly, the UE 115 may receive transmission 320 by monitoring the resources indicated in PDCCH 310-*a*. However, a low latency message 325 associated with a second service (e.g., URLLC traffic) may take precedence over the first service and transmission 320, preempting at least a portion of transmission 320. After receiving PDSCH 315-*a*, the UE 115 may transmit an ACK/NACK 330-*a* that indicated whether the UE 115 successfully decoded a downlink transmission in a slot 305 prior to slot 305-*a* (e.g., a prior slot 305 not shown in FIG. 3).

In a subsequent slot 305-*b* after slot 305-*a*, the UE 115 may receive a PDCCH 310-*b*. Based on low latency message 325 preempting transmission 320, the base station 105 may include a slot-level DLPI 340 in PDCCH 310-*b* informing the UE 115 which resources allocated to it by PDCCH 310-*a* for transmission 320 were preempted by low latency message 325. As such, DLPI 340 may improve the decoding performance of the UE 115 for transmission 320. The UE 115 may then transmit an ACK/NACK 330-*b* (e.g., HARQ feedback) for transmission 320 after taking DLPI 340 into account with a larger delay overhead corresponding to processing time 335. Processing time 335 may be a processing time capability for the UE 115 that indicates an ACK/NACK 330 is at the end of a slot 305. Additionally, the UE 115 may be configured with monitoring for PDCCHs 310 and slot-level DLPIs 340 based on processing time 335.

Although not shown, the UE 115 may receive multiple PDCCHs 310 in each slot 305. For example, the UE 115 may receive three (3) PDCCHs 310 in three (3) consecutive OFDM symbols of a slot 305, where the PDCCHs 310 may occur consecutively.

Figure 4:
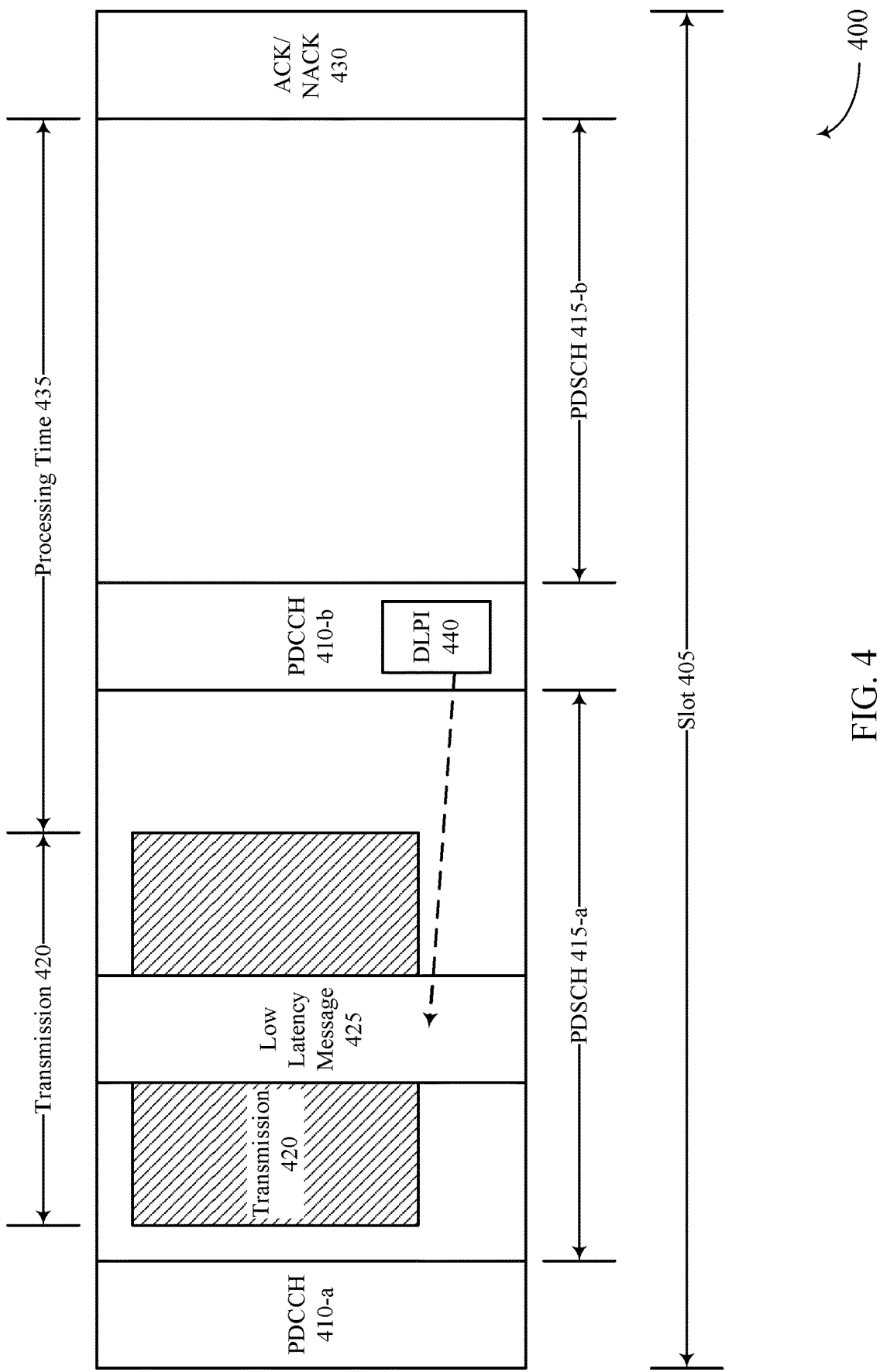
FIGS. 4 and 5 illustrate examples of slot structures that support subslot PDCCH monitoring and a DLPI in accordance with aspects of the present disclosure.

FIG. 4 illustrates an example of a slot structure 400 that supports subslot PDCCH monitoring and a DLPI in accordance with aspects of the present disclosure. In some examples, slot structure 400 may implement aspects of wireless communications systems 100 and/or 200. In some cases, a base station 105 may transmit multiple subslot PDCCHs 410 to a UE 115 in one slot 405 according to slot structure 400.

As described herein, a first subslot PDCCH 410-*a* may indicate resources for the UE 115 to monitor for a transmission 420 in a PDSCH 415-*a*. However, a low latency message 425 may preempt at least a portion of transmission 420. As such, the base station 105 may transmit a DLPI 440 in a subsequent subslot PDCCH 410-*b* in slot 405, where DLPI 440 indicates the resources that were preempted by low latency message 425. In some cases, the base station 105 may configure subslot PDCCH 410-*b* to occur semi-statically at a fixed time duration after the end of PDSCH 415-*a*, where subslot PDCCH 410-*b* is specific to the UE 115 (e.g., a UE-specific PDCCH or a group-common PDCCH). Additionally or alternatively, the base station 105 may configure subslot PDCCH 410-*b* to occur semi-statically at a fixed time within the slot 405. For example, subslot PDCCH 410-*b* may occur after PDSCH 415-*a*, or during PDSCH 415-a. As noted above, DLPI may include a number of bits (n) based on the time duration between subslot PDCCH 410-a and subslot PDCCH 410-b (e.g., m, 2m, etc.), the time duration of PDSCH 415-a (e.g., N, 2N, etc.), or a combination thereof.

In some cases, the UE 115 may be capable of sending an ACK/NACK 430 for transmission 420 within slot 405 after taking DLPI 440 into account according to a processing time 435. Based on processing time 435, the base station 105 may configure the UE 115 to monitor for and receive multiple subslot PDCCHs 410 distributed across slot 405 and enable DLPI 440 (e.g., a minislot-DLPI). Additionally, although not shown, the UE 115 may receive more than two (2) subslot PDCCHs 410 within slot 405, where any subsequent subslot PDCCH 410 after an initial subslot PDCCH 410 may include DLPI 440.

Figure 5:
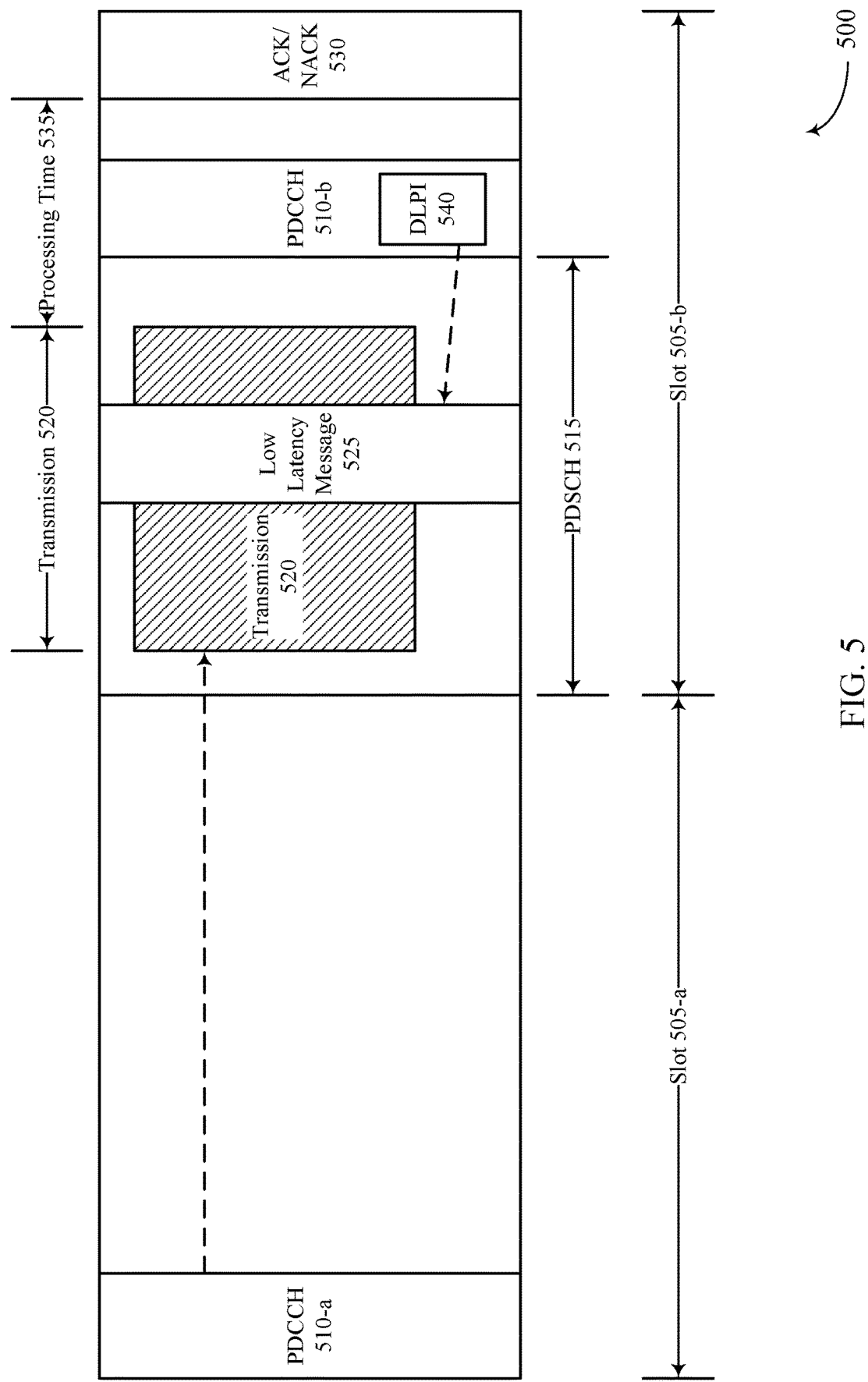

FIG. 5 illustrates an example of a slot structure 500 that supports PDCCH monitoring and a DLPI in accordance with aspects of the present disclosure. In some examples, slot structure 500 may implement aspects of wireless communications systems 100 and/or 200. In some cases, a base station 105 may transmit multiple PDCCHs 510 to a UE 115 across multiple slots 505, where one or more of the multiple PDCCHs 510 may schedule downlink resources for the UE 115 to monitor across the multiple slots 505 (e.g., multi-slot scheduling).

The base station 105 may transmit a first PDCCH 510-a in a first slot 505-a. Additionally or alternatively to slot structure 400 as described above with reference to FIG. 4, first PDCCH 510-a may indicate resources of a PDSCH 515 that occurs in an additional slot 505-b that is different from first slot 505-a for the UE 115 to monitor for data traffic. For example, additional slot 505-b may occur in a next sequential slot 505 after first slot 505-a (e.g., as shown with reference to FIG. 5) or in any subsequent slot 505 after first slot 505-a. Accordingly, the UE 115 may monitor the resources of PDSCH 515 for a transmission 520 associated with the data traffic. However, as described herein, a low latency message 525 may preempt a portion of transmission 520. As such, the base station 105 may transmit a DLPI 540 in a subsequent subslot PDCCH 510-b in additional slot 505-b after PDSCH 515 (e.g., after the transmission 520), where DLPI 540 indicates the resources of PDSCH 515 (e.g., transmission 520) that were preempted by low latency message 525.

Additionally, the UE 115 may be capable of sending an ACK/NACK 530 for transmission 520 within additional slot 505-b (e.g., the same slot 505 that PDSCH 515 with transmission 520 and subslot PDCCH 510-b with DLPI 540 are received) after taking DLPI 540 into account according to a processing time 535. Based on processing time 535, the base station 105 may configure UE 115 to monitor for and receive multiple subslot PDCCHs distributed across additional slot 505-b and enable DLPI 540 (e.g., a minislot-DLPI). For example, according to processing time 535, the UE 115 may take DLPI 540 into account and transmit ACK/NACK 530 within additional slot 505-b (e.g., the same slot) that also contains PDSCH 515. Additionally, although not shown, the UE 115 may receive more than two (2) PDCCHs 510 across the slots 505, where any subsequent PDCCH 510 after an initial PDCCH 510 (e.g., PDCCH 510-a) may include DLPI 540. PDCCHs 510 as described with reference to slot structure 500 may occur in up to three (3) consecutive OFDM symbols that have fixed positions in each slot periodicity within all search space sets that are monitored in a slot 505 (e.g., first PDCCH 510-a), where the up to three (3) consecutive OFDM symbols occur at the beginning of the slot or any span of up to three (3) consecutive OFDM symbols of the slot. Additionally or alternatively, PDCCHs 510 as described with reference to slot structure 500 may occur in different OFDM symbols (e.g., subslot PDCCH 510-b). For example, the UE 115 may monitor for and receive PDCCHs 510 on non-consecutive symbols, distributed across the slot, or a combination thereof.

Figure 6:
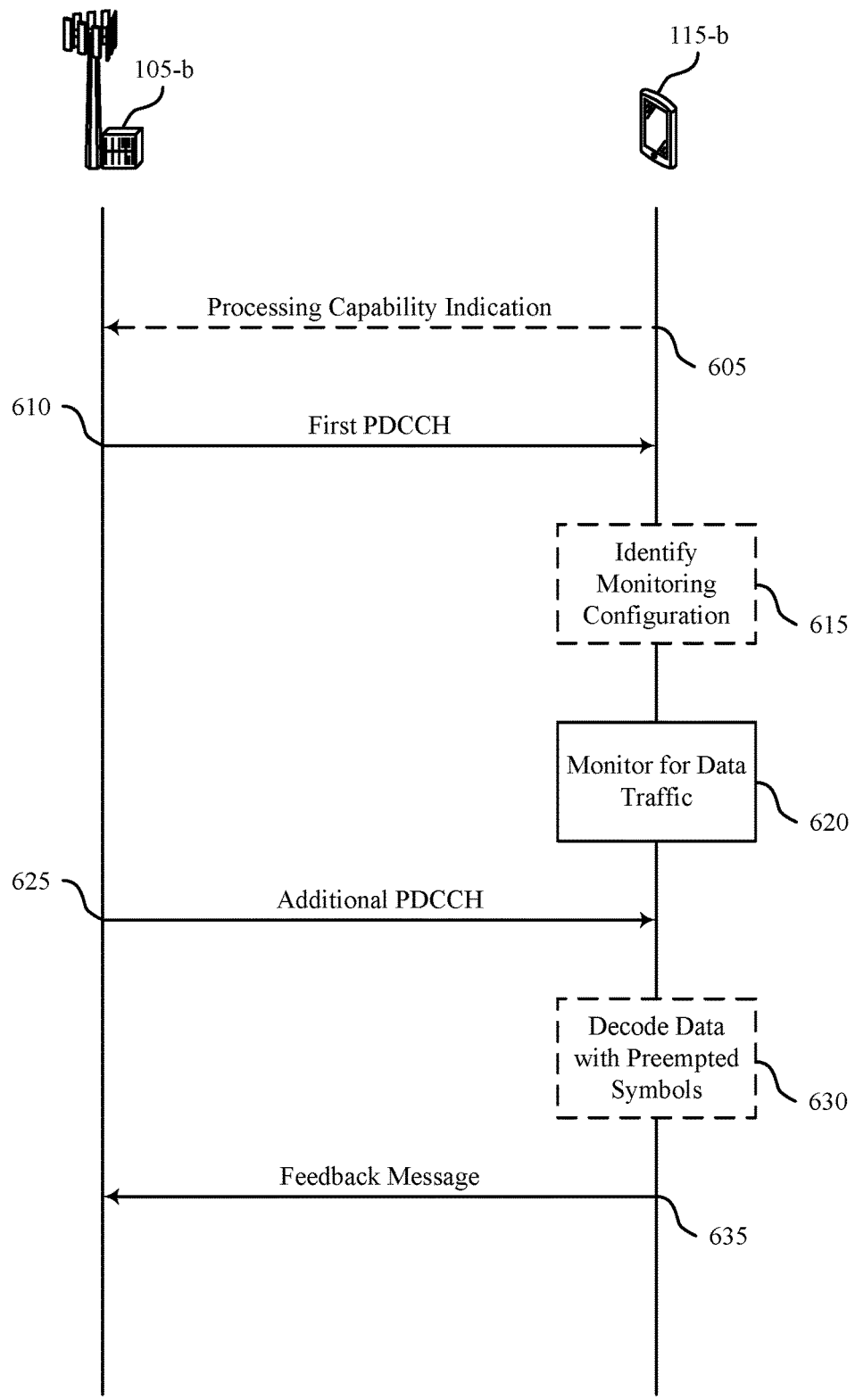
FIG. 6 illustrates an example of a process flow that supports subslot PDCCH monitoring and a DLPI in accordance with aspects of the present disclosure.

FIG. 6 illustrates an example of a process flow 600 that supports subslot PDCCH monitoring and a DLPI in accordance with aspects of the present disclosure. In some examples, process flow 600 may implement aspects of wireless communications systems 100 and/or 200. Process flow 600 may include a base station 105-b and a UE 115-b, which may be examples of corresponding base stations 105 and UEs 115, respectively, as described above with reference to FIGS. 1-5.

In the following description of the process flow 600, the operations between UE 115-b and base station 105-b may be performed in different orders or at different times. Certain operations may also be left out of the process flow 600, or other operations may be added to the process flow 600. It is to be understood that while UE 115-b is shown performing a number of the operations of process flow 600, any wireless device may perform the operations shown.

At 605, UE 115-b may transmit, to base station 105-b, an indication that UE 115-b is capable of processing data traffic within a processing time that facilitates transmission of a feedback message within a slot.

At 610, UE 115-b may receive, from base station 105-b, a first PDCCH message in a slot, the first PDCCH message identifying PDSCH resources within the slot to be monitored by UE 115-b for data traffic.

At 615, UE 115-b may identify that UE 115-b is to monitor the slot for an additional PDCCH message in accordance with a PDCCH monitoring configuration that indicates more than one PDCCH message monitoring occasions in non-consecutive symbols of the slot. For example, UE 115-b may receive configurations (e.g., in the first PDCCH) of control resources sets, common search spaces, UE-specific search spaces, or a combination thereof via RRC messaging, where the PDCCH monitoring configuration includes resources indicated by the configurations of control resource sets, common search spaces, UE-specific search spaces, or the combination thereof. In some cases, UE 115-b may identify, from the PDCCH monitoring configuration, that monitoring for the additional PDCCH message is to occur at a fixed time within the slot. Additionally or alternatively, UE 115-b may identify, from the PDCCH monitoring configuration, that monitoring for the additional PDCCH message is to occur a fixed time after a PDSCH message in which the data traffic is received.

At 620, UE 115-b may monitor for the data traffic in accordance with the first PDCCH message. Additionally, UE 115-b may monitor for the additional PDCCH.

At 625, UE 115-b may receive the additional PDCCH message within the slot, the additional PDCCH message arriving after UE 115-b has started monitoring for the data traffic, the additional PDCCH message including a DLPI indicating that at least a portion of the data traffic was preempted. In some cases, the DLPI may include fewer bits than symbols of the PDSCH message, where at least one bit of the DLPI maps to two or more symbols of the PDSCH message. Additionally or alternatively, the DLPI may include as many bits as symbols of the PDSCH message, and each bit of the DLPI may map to two or more symbols of a subband of the PDSCH message, where the PDSCH message may include a corresponding two or more subbands. In some cases, UE 115-*b* may receive the additional PDCCH message while still monitoring for the data traffic. Additionally, UE 115-*b* may receive the data traffic via a first service (e.g., eMBB traffic), where the portion of the data traffic was preempted by a second service (e.g., URLLC traffic).

At 630, UE 115-*b* may attempt to decode the data traffic received in the PDSCH by taking into account the preempted portion of the data traffic. For example, UE 115-*b* may identify, using the DLPI, one or more symbols of a PDSCH message carrying the data traffic that correspond to the portion of the data traffic that was preempted. Subsequently, UE 115-*b* may then attempt to decode the data traffic based on the identification of the one or more symbols of the PDSCH message that were preempted. Additionally, UE 115-*b* may map bits of the DLPI to symbols and frequency resources of the PDSCH message.

At 635, UE 115-*b* may transmit, during the slot in which the first PDDCH message, the data traffic, and the additional PDCCH message are received, a feedback message associated with receipt of the data traffic. In some cases, the feedback message may indicate whether the data traffic was successfully decoded.

Additionally or alternatively, UE 115-*b* may receive the first PDCCH message in a first slot, the first PDCCH message identifying the PDSCH resources within an additional slot to be monitored by UE 115-*b* for data traffic. Accordingly, UE 115-*b* may then monitor for the data traffic in the additional slot in accordance with the first PDCCH message. As described above, UE 115-*b* may receive the additional PDCCH message within the additional slot, the additional PDCCH message arriving after UE 115-*b* has started monitoring for the data traffic, the additional PDCCH message including the DLPI indicating that at least a portion of the data traffic was preempted. UE 115-*b* may then transmit, during the additional slot in which the data traffic and the additional PDCCH message are received, the feedback message associated with receipt of the data traffic.

Figure 7:
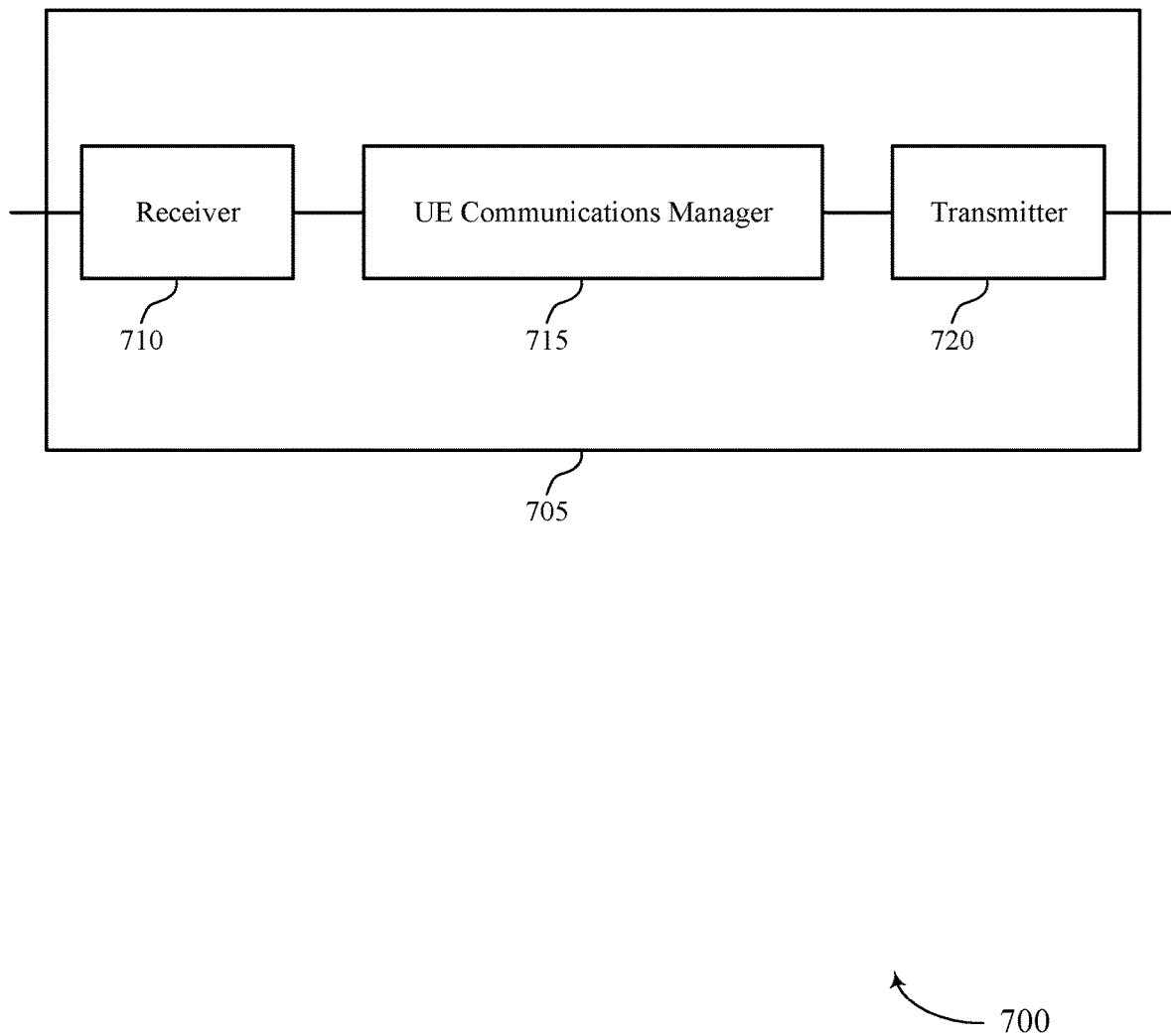
FIGS. 7 and 8 show block diagrams of devices that support subslot PDCCH monitoring and a DLPI in accordance with aspects of the present disclosure.

FIG. 7 shows a block diagram 700 of a device 705 that supports subslot PDCCH monitoring and a DLPI in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to subslot PDCCH monitoring and DLPI, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may receive a first PDCCH message in a slot, the first PDCCH message identifying PDSCH resources within the slot to be monitored by the UE for data traffic and may monitor for the data traffic in accordance with the first PDCCH message. In some cases, UE communications manager 715 may receive an additional PDCCH message within the slot, the additional PDCCH message arriving after the UE has started monitoring for the data traffic. Additionally, the additional PDCCH message may include a DLPI indicating that at least a portion of the data traffic was preempted. Subsequently, UE communications manager 715 may transmit, during the slot in which the first PDDCH message, the data traffic, and the additional PDCCH message are received, a feedback message associated with receipt of the data traffic.

Additionally or alternatively, UE communications manager 715 may receive a first PDCCH message in a first slot, the first PDCCH message identifying PDSCH resources within an additional slot to be monitored by the UE for data traffic and may monitor for the data traffic in the additional slot in accordance with the first PDCCH message. In some cases, UE communications manager 715 may receive an additional PDCCH message within the additional slot, the additional PDCCH message arriving after the UE has started monitoring for the data traffic. Additionally, the additional PDCCH message may include a DLPI indicating that at least a portion of the data traffic was preempted. Subsequently, UE communications manager 715 may then transmit, during the additional slot in which the data traffic and the additional PDCCH message are received, a feedback message associated with receipt of the data traffic. The UE communications manager 715 may be an example of aspects of the UE communications manager 1010 described herein.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
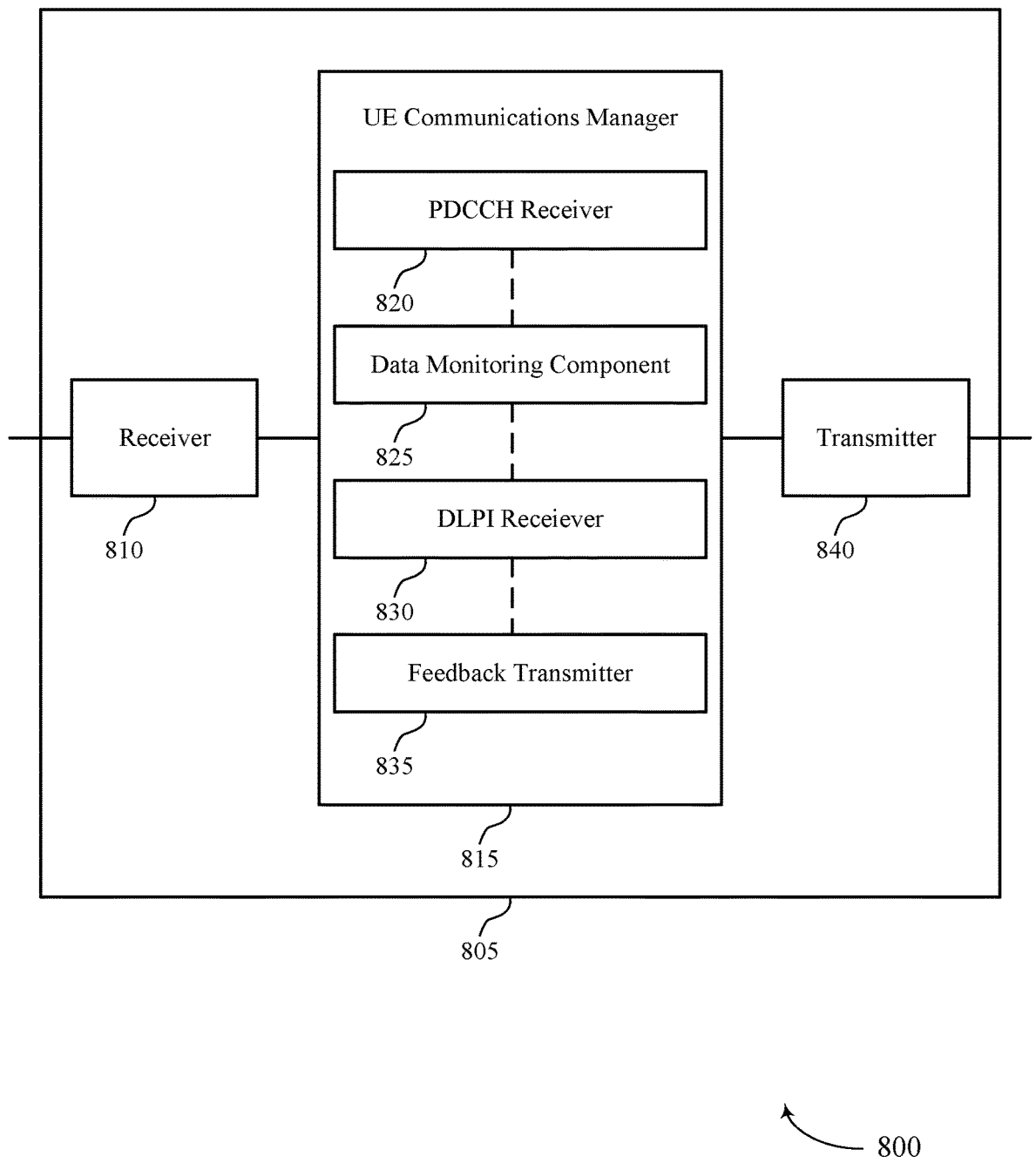

FIG. 8 shows a block diagram 800 of a device 805 that supports subslot PDCCH monitoring and a DLPI in accordance with aspects of the present disclosure. The device 805 may be an example of aspects of a device 705 or a UE 115 as described herein. The device 805 may include a receiver 810, a UE communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to subslot PDCCH monitoring and DLPI, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a PDCCH receiver 820, a data monitoring component 825, a DLPI receiver 830, and a feedback transmitter 835. The UE communications manager 815 may be an example of aspects of the UE communications manager 1010 described herein.

The PDCCH receiver 820 may receive a first PDCCH message in a slot, the first PDCCH message identifying PDSCH resources within the slot to be monitored by the UE for data traffic. Additionally or alternatively, the PDCCH receiver 820 may receive the first PDCCH message in a first slot, the first PDCCH message identifying PDSCH resources within an additional slot to be monitored by the UE for the data traffic.

The data monitoring component 825 may monitor for the data traffic in accordance with the first PDCCH message. In some cases, the data monitoring component 825 may monitor for the data traffic in the additional slot in accordance with the first PDCCH message.

The DLPI receiver 830 may receive an additional PDCCH message within the slot, the additional PDCCH message arriving after the UE has started monitoring for the data traffic, the additional PDCCH message including a DLPI indicating that at least a portion of the data traffic was preempted. Additionally or alternatively, the DLPI receiver 830 may receive an additional PDCCH message within the additional slot, the additional PDCCH message arriving after the UE has started monitoring for the data traffic, the additional PDCCH message including a DLPI indicating that at least a portion of the data traffic was preempted.

The feedback transmitter 835 may transmit, during the slot in which the first PDDCH message, the data traffic, and the additional PDCCH message are received, a feedback message associated with receipt of the data traffic. In some cases, the feedback transmitter 835 may transmit the feedback message associated with receipt of the data traffic during the additional slot. Additionally or alternatively, the feedback transmitter 835 may transmit, during the additional slot in which the data traffic and the additional PDCCH message are received, a feedback message associated with receipt of the data traffic.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
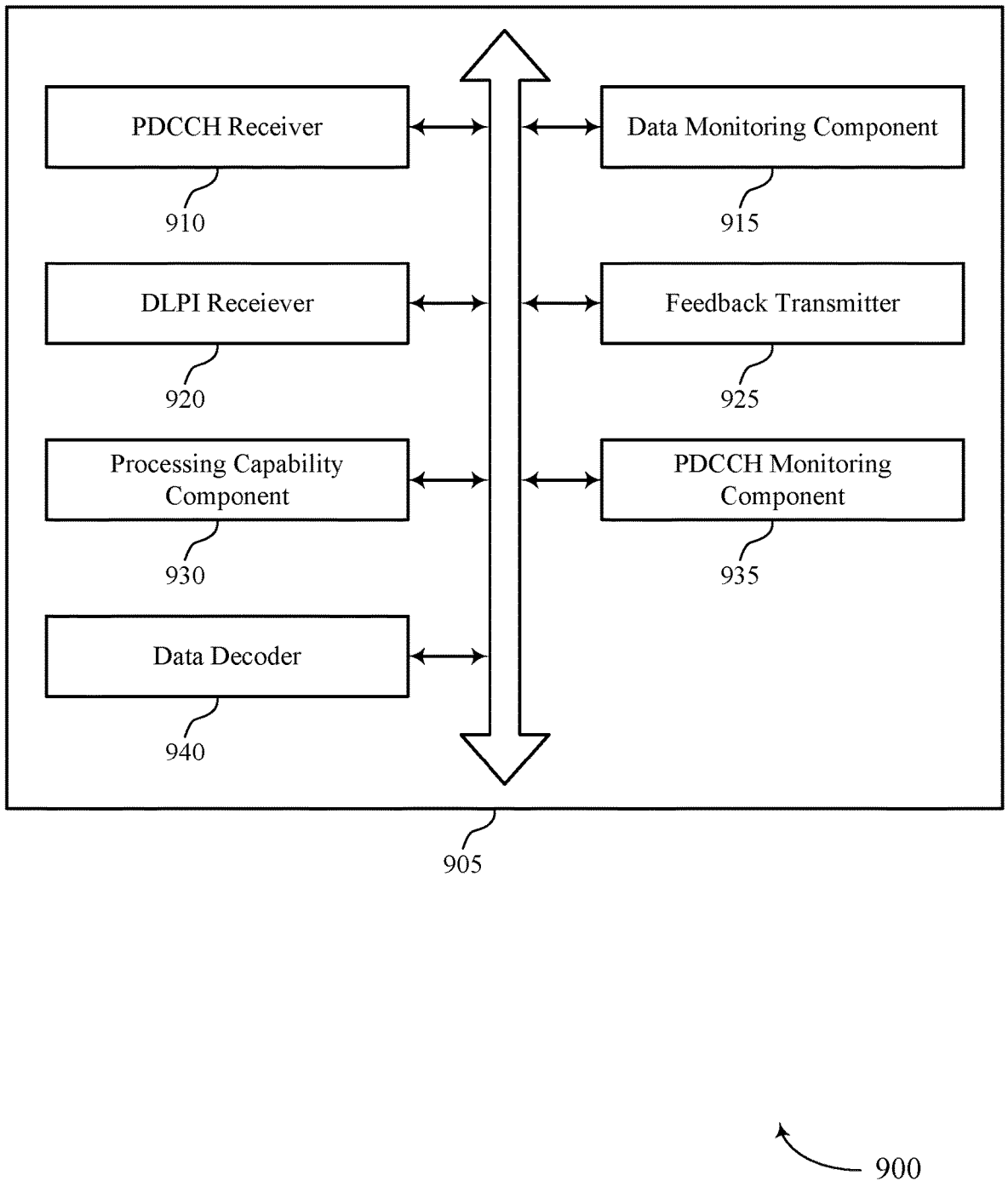
FIG. 9 shows a block diagram of a UE communications manager that supports sub slot PDCCH monitoring and a DLPI in accordance with aspects of the present disclosure.

FIG. 9 shows a block diagram 900 of a UE communications manager 905 that supports subslot PDCCH monitoring and a DLPI in accordance with aspects of the present disclosure. The UE communications manager 905 may be an example of aspects of a UE communications manager 715, a UE communications manager 815, or a UE communications manager 1010 described herein. The UE communications manager 905 may include a PDCCH receiver 910, a data monitoring component 915, a DLPI receiver 920, a feedback transmitter 925, a processing capability component 930, a PDCCH monitoring component 935, and a data decoder 940. Each of these modules may communicate, directly or indirectly, with one another (e.g., via one or more buses).

The PDCCH receiver 910 may receive a first PDCCH message in a slot, the first PDCCH message identifying PDSCH resources within the slot to be monitored by the UE for data traffic. Additionally or alternatively, the PDCCH receiver 910 may receive the first PDCCH message in a first slot, the first PDCCH message identifying PDSCH resources within an additional slot to be monitored by the UE for the data traffic.

The data monitoring component 915 may monitor for the data traffic in accordance with the first PDCCH message. In some cases, the data monitoring component 915 may monitor for the data traffic in the additional slot in accordance with the first PDCCH message.

The DLPI receiver 920 may receive an additional PDCCH message within the slot, the additional PDCCH message arriving after the UE has started monitoring for the data traffic, the additional PDCCH message including a DLPI indicating that at least a portion of the data traffic was preempted. Additionally or alternatively, the DLPI receiver 920 may receive an additional PDCCH message within the additional slot, the additional PDCCH message arriving after the UE has started monitoring for the data traffic, the additional PDCCH message including a DLPI indicating that at least a portion of the data traffic was preempted.

In some examples, the DLPI receiver 920 may receive the additional PDCCH message while the UE is still monitoring for the data traffic. In some examples, the DLPI receiver 920 may receive the data traffic via a first service, where the portion of the data traffic was preempted by a second service. In some cases, the first service may be eMBB traffic, and the second service may be URLLC traffic.

The feedback transmitter 925 may transmit, during the slot in which the first PDDCH message, the data traffic, and the additional PDCCH message are received, a feedback message associated with receipt of the data traffic. In some cases, the feedback transmitter 925 may transmit the feedback message associated with receipt of the data traffic during the additional slot. Additionally or alternatively, the feedback transmitter 925 may transmit, during the additional slot in which the data traffic and the additional PDCCH message are received, a feedback message associated with receipt of the data traffic.

The processing capability component 930 may transmit an indication that the UE is capable of processing the data traffic within a processing time that facilitates transmission of the feedback message within the slot, where inclusion of the DLPI within the additional PDCCH message within the slot is based on the UE being capable of processing the data traffic within the processing time. In some examples, the processing capability component 930 may transmit an indication that the UE is capable of processing the data traffic within a processing time that facilitates transmission of the feedback message within the additional slot, where inclusion of the DLPI within the additional PDCCH message within the additional slot is based on the UE being capable of processing the data traffic within the processing time.

The PDCCH monitoring component 935 may identify that the UE is to monitor the slot for the additional PDCCH message in accordance with a PDCCH monitoring configuration that indicates more than one PDCCH message monitoring occasions in non-consecutive symbols of the slot and/or of the additional slot. In some examples, PDCCH monitoring component 935 may receive configurations of control resources sets, common search spaces, UE-specific search spaces, or a combination thereof via RRC messaging, where the PDCCH monitoring configuration includes resources indicated by the configurations of control resource sets, common search spaces, UE-specific search spaces, or the combination thereof. In some examples, the PDCCH monitoring component 935 may identify, from the PDCCH monitoring configuration, that monitoring for the additional PDCCH message is to occur at a fixed time within the slot and/or the additional slot. Additionally or alternatively, the PDCCH monitoring component 935 may identify, from the PDCCH monitoring configuration, that monitoring for the additional PDCCH message is to occur a fixed time after a PDSCH message in which the data traffic is received.

The data decoder 940 may identify, using the DLPI, one or more symbols of a PDSCH message carrying the data traffic that correspond to the portion of the data traffic that was preempted. In some examples, the data decoder 940 may attempt to decode the data traffic based on the identification of the one or more symbols of the PDSCH message that were preempted, where the feedback message indicates whether the data traffic was successfully decoded. Additionally, the data decoder 940 may map bits of the DLPI to symbols and frequency resources of the PDSCH message. In some cases, the DLPI may include fewer bits than symbols of the PDSCH message, where at least one bit of the DLPI maps to two or more symbols of the PDSCH message. Additionally or alternatively, the DLPI may include as many bits as symbols of the PDSCH message, where each bit of the DLPI maps to two or more symbols of a subband of the PDSCH message and the PDSCH message includes a corresponding two or more subbands.

Figure 10:
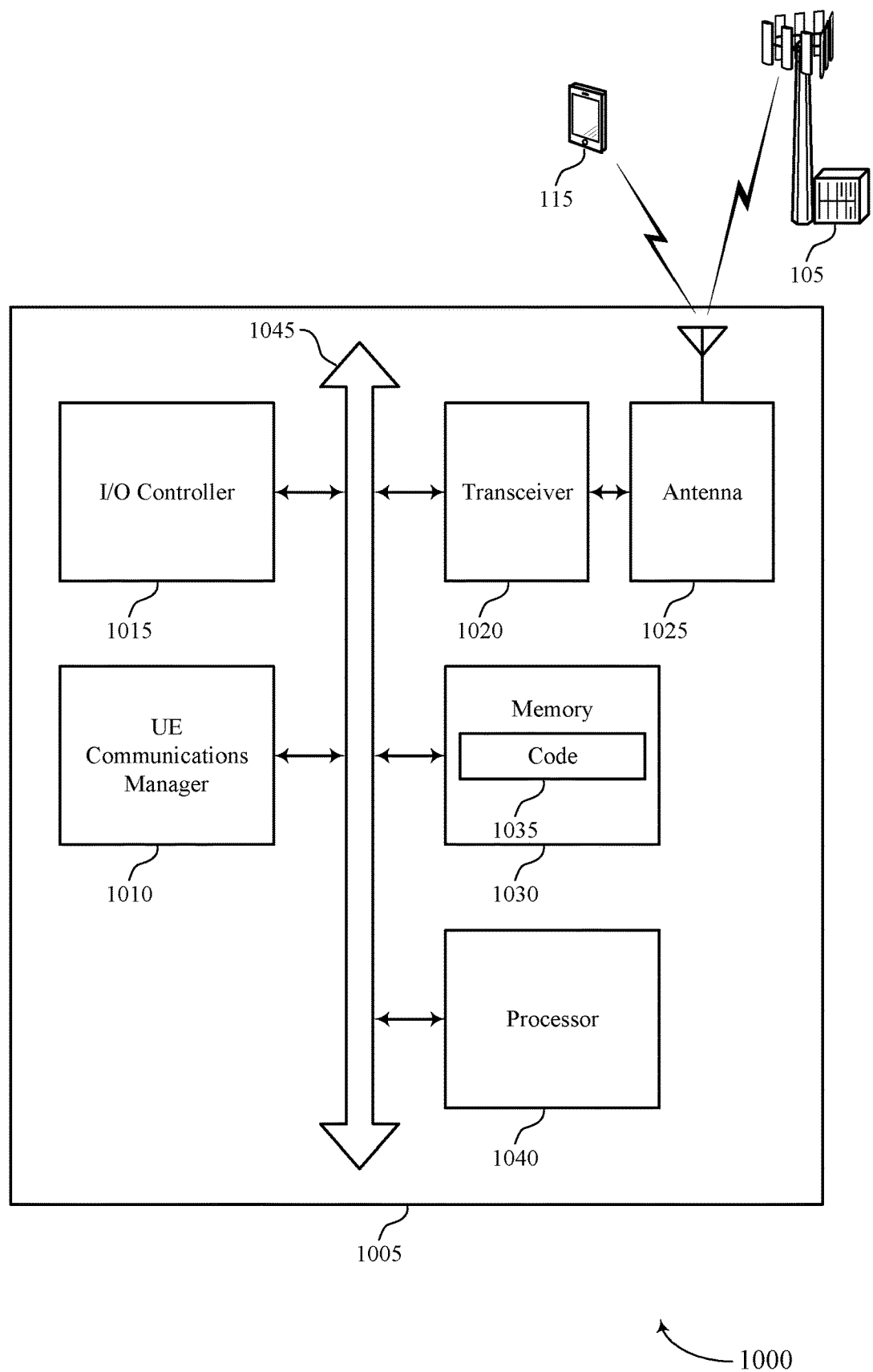
FIG. 10 shows a diagram of a system including a device that supports subslot PDCCH monitoring and a DLPI in accordance with aspects of the present disclosure.

FIG. 10 shows a diagram of a system 1000 including a device 1005 that supports sub slot PDCCH monitoring and a DLPI in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

The UE communications manager 1010 may receive a first PDCCH message in a slot, the first PDCCH message identifying PDSCH resources within the slot to be monitored by the UE for data traffic and monitor for the data traffic in accordance with the first PDCCH message. In some cases, UE communications manager 1010 may receive an additional PDCCH message within the slot, the additional PDCCH message arriving after the UE has started monitoring for the data traffic. Additionally, the additional PDCCH message may include a DLPI indicating that at least a portion of the data traffic was preempted. Subsequently, UE communications manager 1010 may transmit, during the slot in which the first PDDCH message, the data traffic, and the additional PDCCH message are received, a feedback message associated with receipt of the data traffic.

Additionally or alternatively, UE communications manager 1010 may receive a first PDCCH message in a first slot, the first PDCCH message identifying PDSCH resources within an additional slot to be monitored by the UE for data traffic and may monitor for the data traffic in the additional slot in accordance with the first PDCCH message. In some cases, UE communications manager 1010 may receive an additional PDCCH message within the additional slot, the additional PDCCH message arriving after the UE has started monitoring for the data traffic. Additionally, the additional PDCCH message may include a DLPI indicating that at least a portion of the data traffic was preempted. Subsequently, UE communications manager 1010 may then transmit, during the additional slot in which the data traffic and the additional PDCCH message are received, a feedback message associated with receipt of the data traffic The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sub slot PDCCH monitoring and DLPI).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
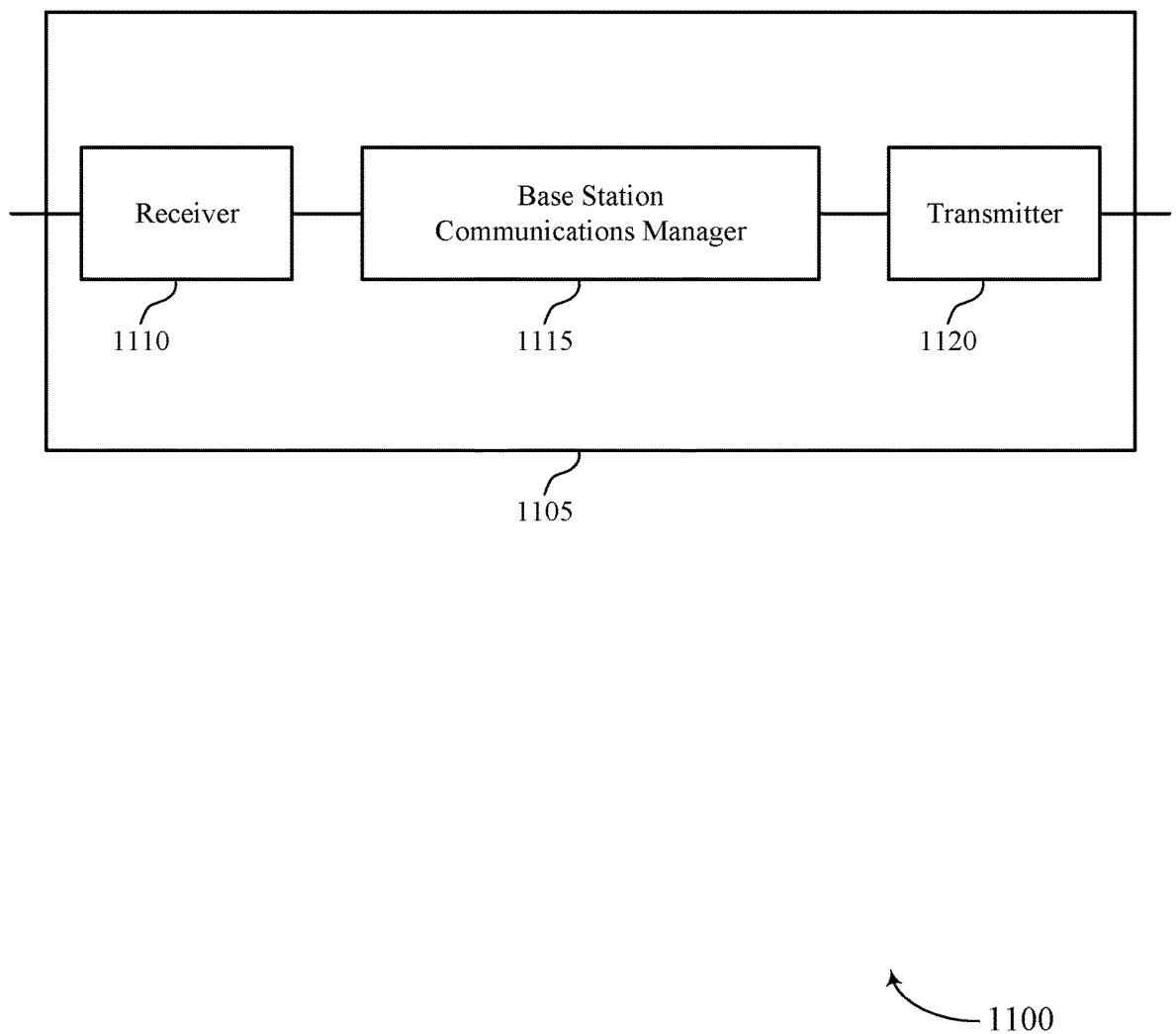
FIGS. 11 and 12 show block diagrams of devices that support subslot PDCCH monitoring and a DLPI in accordance with aspects of the present disclosure.

FIG. 11 shows a block diagram 1100 of a device 1105 that supports subslot PDCCH monitoring and a DLPI in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to subslot PDCCH monitoring and DLPI, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may transmit, to a UE, a first PDCCH message in a slot, the first PDCCH message identifying PDSCH resources on which data traffic is to be transmitted within the slot. Additionally, base station communications manager 1115 may transmit the data traffic in accordance with the first PDCCH message. In some cases, base station communications manager 1115 may transmit an additional PDCCH message within the slot, the additional PDCCH message being transmitted after transmission of the data traffic has started. Additionally, the additional PDCCH message may include a DLPI indicating that at least a portion of the data traffic was preempted. In some cases, base station communications manager 1115 may receive, from the UE and during the slot in which the first PDDCH message, the data traffic, and the additional PDCCH message are transmitted, a feedback message associated with receipt of the data traffic.

Additionally or alternatively, base station communications manager 1115 may transmit, to a UE, the first PDCCH message in a first slot, the first PDCCH message identifying PDSCH resources on which the data traffic is to be transmitted within an additional slot. Subsequently, base station communications manager 1115 may transmit the data traffic in the additional slot in accordance with the first PDCCH message. In some cases, base station communications manager 1115 may transmit an additional PDCCH message within the additional slot, the additional PDCCH message being transmitted after transmission of the data traffic has started. Additionally, the additional PDCCH message may include a DLPI indicating that at least a portion of the data traffic was preempted. Base station communications manager 1115 may then receive, from the UE and during the additional slot in which the data traffic and the additional PDCCH message are transmitted, the feedback message associated with receipt of the data traffic. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an ASIC, a FPGA or other PLD, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
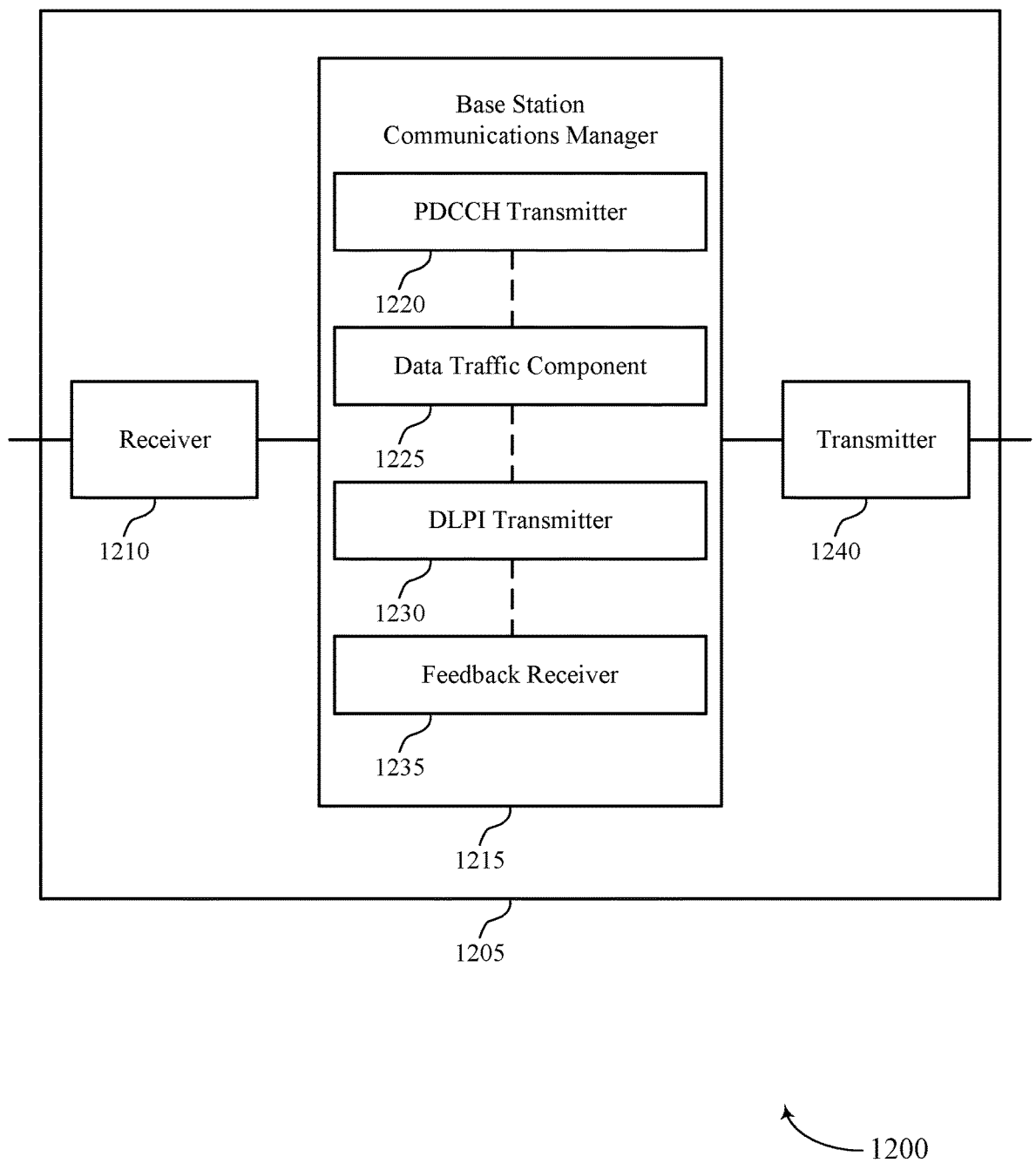

FIG. 12 shows a block diagram 1200 of a device 1205 that supports subslot PDCCH monitoring and a DLPI in accordance with aspects of the present disclosure. The device 1205 may be an example of aspects of a device 1105 or a base station 105 as described herein. The device 1205 may include a receiver 1210, a base station communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to subslot PDCCH monitoring and DLPI, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a PDCCH transmitter 1220, a data traffic component 1225, a DLPI transmitter 1230, and a feedback receiver 1235. The base station communications manager 1215 may be an example of aspects of the base station communications manager 1410 described herein.

The PDCCH transmitter 1220 may transmit, to a UE, a first PDCCH message in a slot, the first PDCCH message identifying PDSCH resources on which data traffic is to be transmitted within the slot. Additionally or alternatively, the PDCCH transmitter 1220 may transmit, to the UE, the first PDCCH message in a first slot, the first PDCCH message identifying PDSCH resources on which the data traffic is to be transmitted within an additional slot.

The data traffic component 1225 may transmit the data traffic in accordance with the first PDCCH message. In some cases, the data traffic component 1225 may transmit the data traffic in the additional slot in accordance with the first PDCCH message.

The DLPI transmitter 1230 may transmit an additional PDCCH message within the slot, the additional PDCCH message being transmitted after transmission of the data traffic has started, the additional PDCCH message including a DLPI indicating that at least a portion of the data traffic was preempted. Additionally or alternatively, the DLPI transmitter 1230 may transmit the additional PDCCH message within the additional slot, the additional PDCCH message being transmitted after transmission of the data traffic has started, the additional PDCCH message including the DLPI indicating that at least a portion of the data traffic was preempted.

The feedback receiver 1235 may receive, from the UE and during the slot in which the first PDDCH message, the data traffic, and the additional PDCCH message are transmitted, a feedback message associated with receipt of the data traffic. In some cases, the feedback receiver 1235 may receive, from the UE, the feedback message associated with receipt of the data traffic during the additional slot. Additionally or alternatively, the feedback receiver 1235 may receive, from the UE and during the additional slot in which the data traffic and the additional PDCCH message are transmitted, the feedback message associated with receipt of the data traffic.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
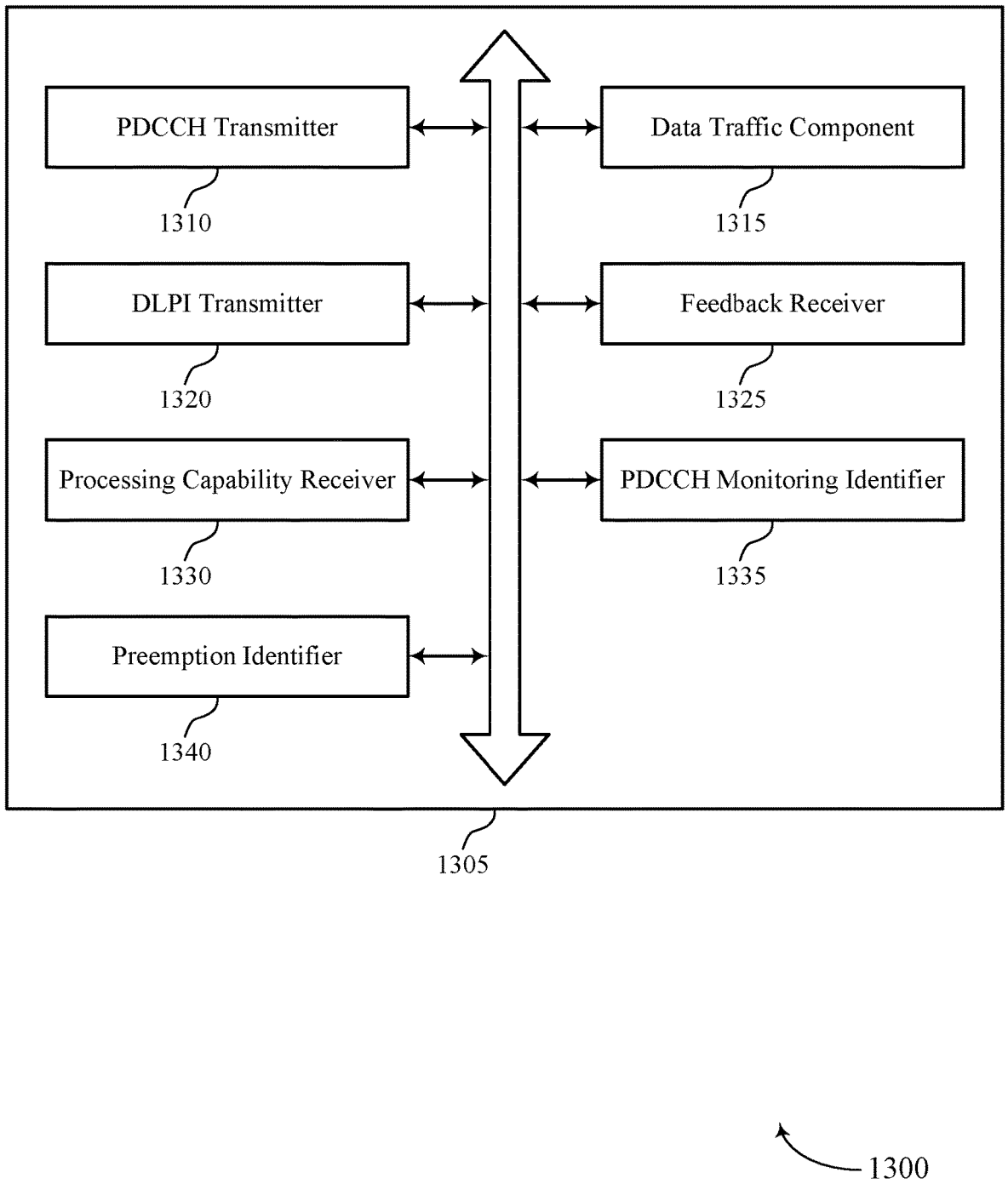
FIG. 13 shows a block diagram of a base station communications manager that supports subslot PDCCH monitoring and a DLPI in accordance with aspects of the present disclosure.

FIG. 13 shows a block diagram 1300 of a base station communications manager 1305 that supports subslot PDCCH monitoring and DLPI in accordance with aspects of the present disclosure. The base station communications manager 1305 may be an example of aspects of a base station communications manager 1115, a base station communications manager 1215, or a base station communications manager 1410 described herein. The base station communications manager 1305 may include a PDCCH transmitter 1310, a data traffic component 1315, a DLPI transmitter 1320, a feedback receiver 1325, a processing capability receiver 1330, a PDCCH monitoring identifier 1335, and a preemption identifier 1340. Each of these modules may communicate, directly or indirectly, with one another (e.g., via one or more buses).

The PDCCH transmitter 1310 may transmit, to a UE, a first PDCCH message in a slot, the first PDCCH message identifying PDSCH resources on which data traffic is to be transmitted within the slot. Additionally or alternatively, the PDCCH transmitter 1310 may transmit, to the UE, the first PDCCH message in a first slot, the first PDCCH message identifying PDSCH resources on which the data traffic is to be transmitted within an additional slot.

The data traffic component 1315 may transmit the data traffic in accordance with the first PDCCH message. In some cases, the data traffic component 1315 may transmit the data traffic in the additional slot in accordance with the first PDCCH message.

The DLPI transmitter 1320 may transmit an additional PDCCH message within the slot, the additional PDCCH message being transmitted after transmission of the data traffic has started, the additional PDCCH message including a DLPI indicating that at least a portion of the data traffic was preempted. Additionally or alternatively, the DLPI transmitter 1320 may transmit the additional PDCCH message within the additional slot, the additional PDCCH message being transmitted after transmission of the data traffic has started, the additional PDCCH message including the DLPI indicating that at least a portion of the data traffic was preempted. In some examples, the DLPI transmitter 1320 may transmit the additional PDCCH message while still transmitting the data traffic. In some examples, the DLPI transmitter 1320 may transmit the data traffic via a first service, where the portion of the data traffic was preempted by a second service. In some cases, the first service may be eMBB traffic, and the second service may be URLLC traffic.

The feedback receiver 1325 may receive, from the UE and during the slot in which the first PDDCH message, the data traffic, and the additional PDCCH message are transmitted, a feedback message associated with receipt of the data traffic. In some cases, the feedback receiver 1325 may receive, from the UE, the feedback message associated with receipt of the data traffic during the additional slot. Additionally or alternatively, the feedback receiver 1325 may receive, from the UE and during the additional slot in which the data traffic and the additional PDCCH message are transmitted, the feedback message associated with receipt of the data traffic.

The processing capability receiver 1330 may receive an indication that the UE is capable of processing the data traffic within a processing time that facilitates transmission of the feedback message within the slot, where inclusion of the DLPI within the additional PDCCH message within the slot is based on the UE being capable of processing the data traffic within the processing time. In some examples, the processing capability receiver 1330 may receive an indication that the UE is capable of processing the data traffic within a processing time that facilitates transmission of the feedback message within the additional slot, where inclusion of the DLPI within the additional PDCCH message within the additional slot is based on the UE being capable of processing the data traffic within the processing time.

The PDCCH monitoring identifier 1335 may identify a PDCCH monitoring configuration that indicates more than one PDCCH message monitoring occasions in non-consecutive symbols of the slot and/or the additional slot, where the additional PDCCH message is transmitted in accordance with the PDCCH monitoring configuration. In some examples, PDCCH monitoring identifier 1335 may transmit configurations of control resources sets, common search spaces, UE-specific search spaces, or a combination thereof via RRC messaging, where the PDCCH monitoring configuration includes resources indicated by the configurations of control resource sets, common search spaces, UE-specific search spaces, or the combination thereof. Additionally, the PDCCH monitoring identifier 1335 may identify, from the PDCCH monitoring configuration, that the additional PDCCH message is to be transmitted at a fixed time within the slot and/or additional slot. In some examples, the PDCCH monitoring identifier 1335 may identify, from the PDCCH monitoring configuration, that the additional PDCCH message is to be transmitted at a fixed time after transmission of a PDSCH message which includes the data traffic is completed.

The preemption identifier 1340 may identify, using the DLPI, one or more symbols of a PDSCH message carrying the data traffic that correspond to the portion of the data traffic that was preempted. In some examples, the preemption identifier 1340 may map bits of the DLPI to symbols and frequency resources of the PDSCH message. In some cases, the DLPI may include fewer bits than symbols of the PDSCH message, where at least one bit of the DLPI maps to two or more symbols of the PDSCH message. Additionally or alternatively, the DLPI may include as many bits as symbols of the PDSCH message, where each bit of the DLPI maps to two or more symbols of a subband of the PDSCH message and the PDSCH message includes a corresponding two or more subbands.

Figure 14:
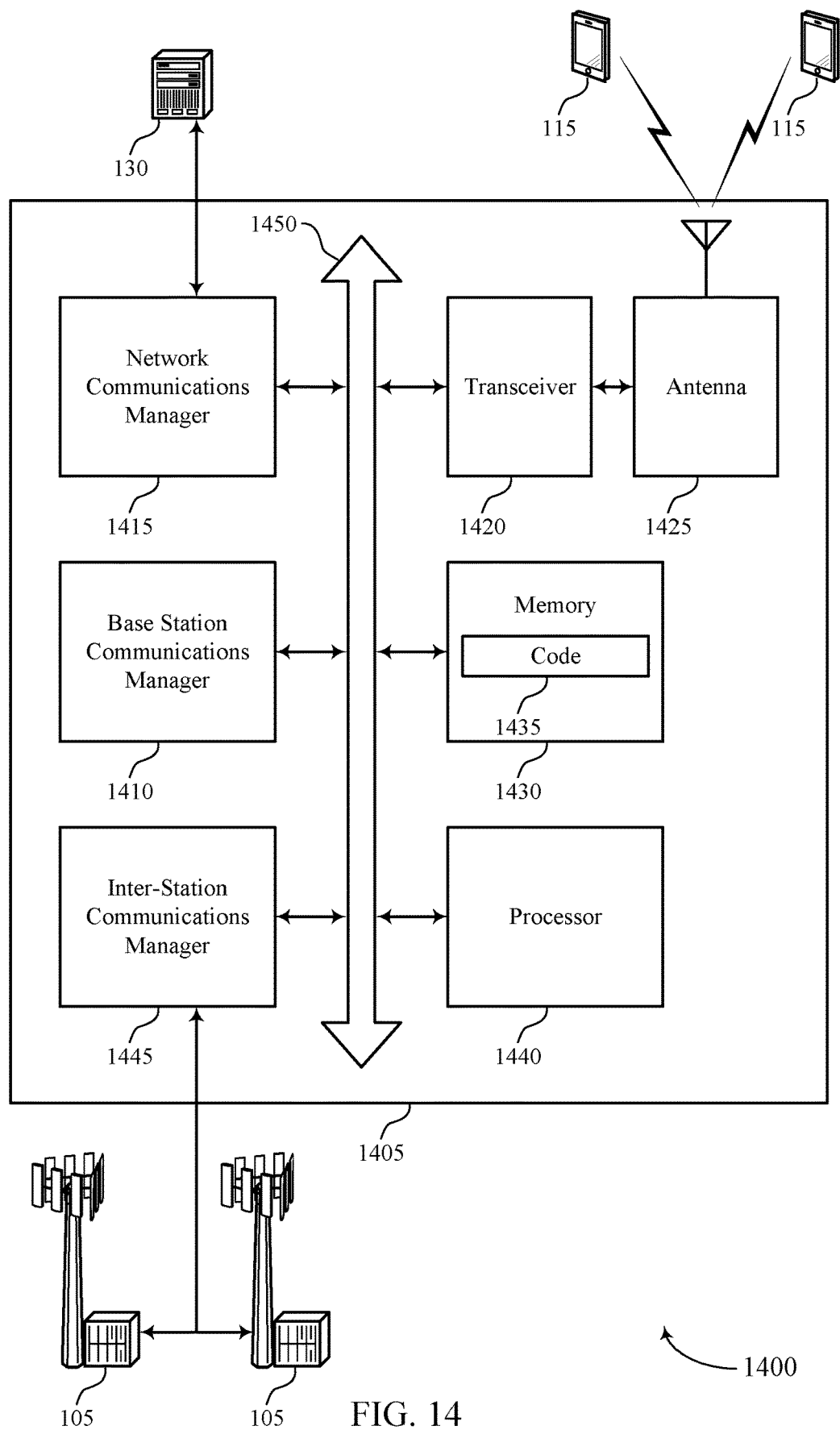
FIG. 14 shows a diagram of a system including a device that supports subslot PDCCH monitoring and a DLPI in accordance with aspects of the present disclosure.

FIG. 14 shows a diagram of a system 1400 including a device 1405 that supports subslot PDCCH monitoring and DLPI in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may transmit, to a UE, a first PDCCH message in a slot, the first PDCCH message identifying PDSCH resources on which data traffic is to be transmitted within the slot. In some cases, base station communications manager 1410 may transmit the data traffic in accordance with the first PDCCH message. Additionally, base station communications manager 1410 may transmit an additional PDCCH message within the slot, the additional PDCCH message being transmitted after transmission of the data traffic has started. In some cases, the additional PDCCH message may include a DLPI indicating that at least a portion of the data traffic was preempted. Subsequently, base station communications manager 1410 may receive, from the UE and during the slot in which the first PDDCH message, the data traffic, and the additional PDCCH message are transmitted, a feedback message associated with receipt of the data traffic.

Additionally or alternatively, base station communications manager 1410 may transmit, to the UE, the first PDCCH message in a first slot, the first PDCCH message identifying PDSCH resources on which the data traffic is to be transmitted within an additional slot. Subsequently, base station communications manager 1410 may transmit the data traffic in the additional slot in accordance with the first PDCCH message. In some cases, base station communications manager 1410 may transmit the additional PDCCH message within the additional slot, the additional PDCCH message being transmitted after transmission of the data traffic has started. Additionally, the additional PDCCH message may include the DLPI indicating that at least a portion of the data traffic was preempted. Base station communications manager 1410 may then receive, from the UE and during the additional slot in which the data traffic and the additional PDCCH message are transmitted, the feedback message associated with receipt of the data traffic.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting subslot PDCCH monitoring and DLPI).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
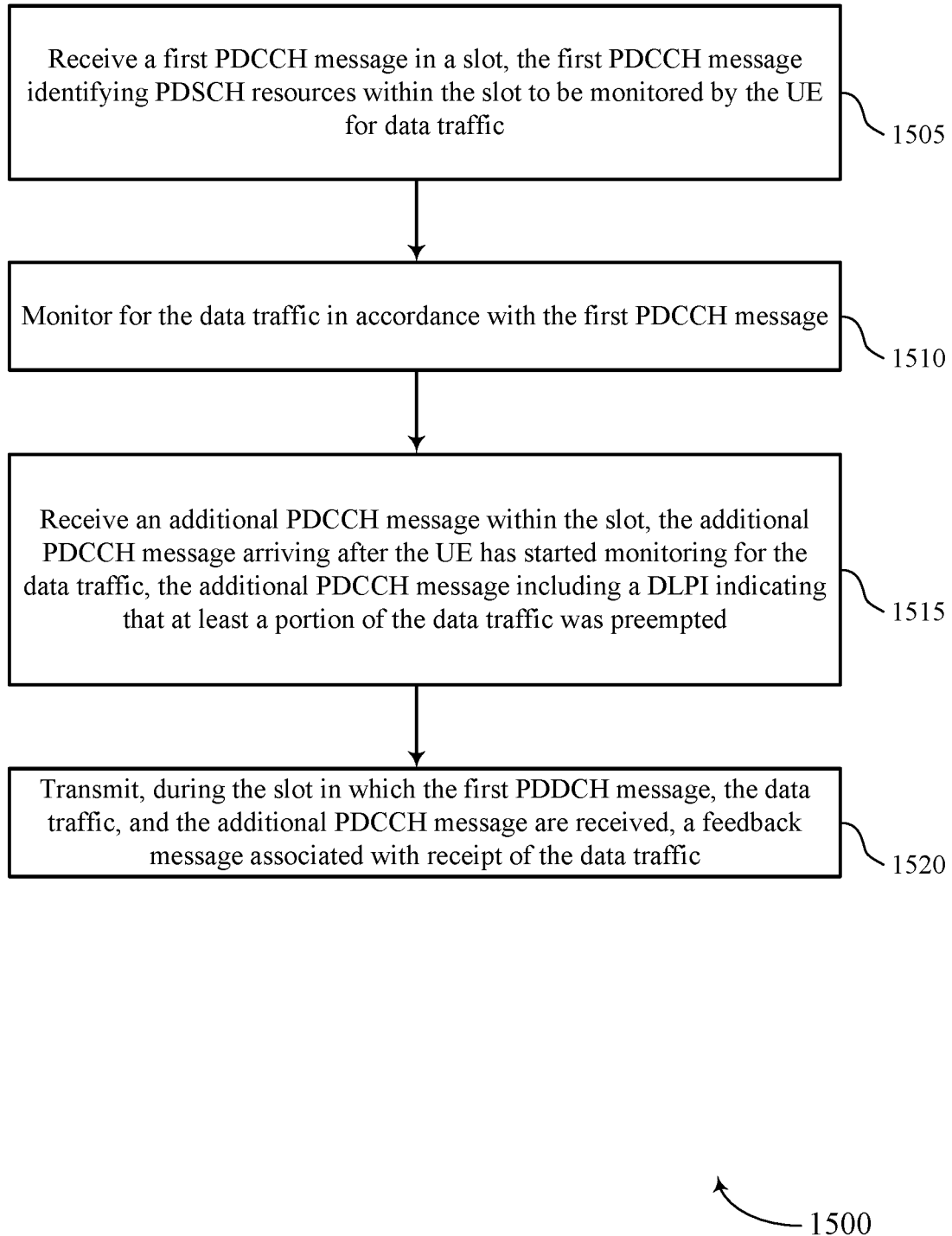
FIGS. 15 through 21 show flowcharts illustrating methods that support subslot PDCCH monitoring and a DLPI in accordance with aspects of the present disclosure.

FIG. 15 shows a flowchart illustrating a method 1500 that supports subslot PDCCH monitoring and a DLPI in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a first PDCCH message in a slot, the first PDCCH message identifying PDSCH resources within the slot to be monitored by the UE for data traffic. The operations of 1505 may be performed according to the methods described herein. In some examples, aspects of the operations of 1505 may be performed by a PDCCH receiver as described with reference to FIGS. 7 through 10.

At 1510, the UE may monitor for the data traffic in accordance with the first PDCCH message. The operations of 1510 may be performed according to the methods described herein. In some examples, aspects of the operations of 1510 may be performed by a data monitoring component as described with reference to FIGS. 7 through 10.

At 1515, the UE may receive an additional PDCCH message within the slot, the additional PDCCH message arriving after the UE has started monitoring for the data traffic, the additional PDCCH message including a DLPI indicating that at least a portion of the data traffic was preempted. The operations of 1515 may be performed according to the methods described herein. In some examples, aspects of the operations of 1515 may be performed by a DLPI receiver as described with reference to FIGS. 7 through 10.

At 1520, the UE may transmit, during the slot in which the first PDDCH message, the data traffic, and the additional PDCCH message are received, a feedback message associated with receipt of the data traffic. The operations of 1520 may be performed according to the methods described herein. In some examples, aspects of the operations of 1520 may be performed by a feedback transmitter as described with reference to FIGS. 7 through 10.

Figure 16:
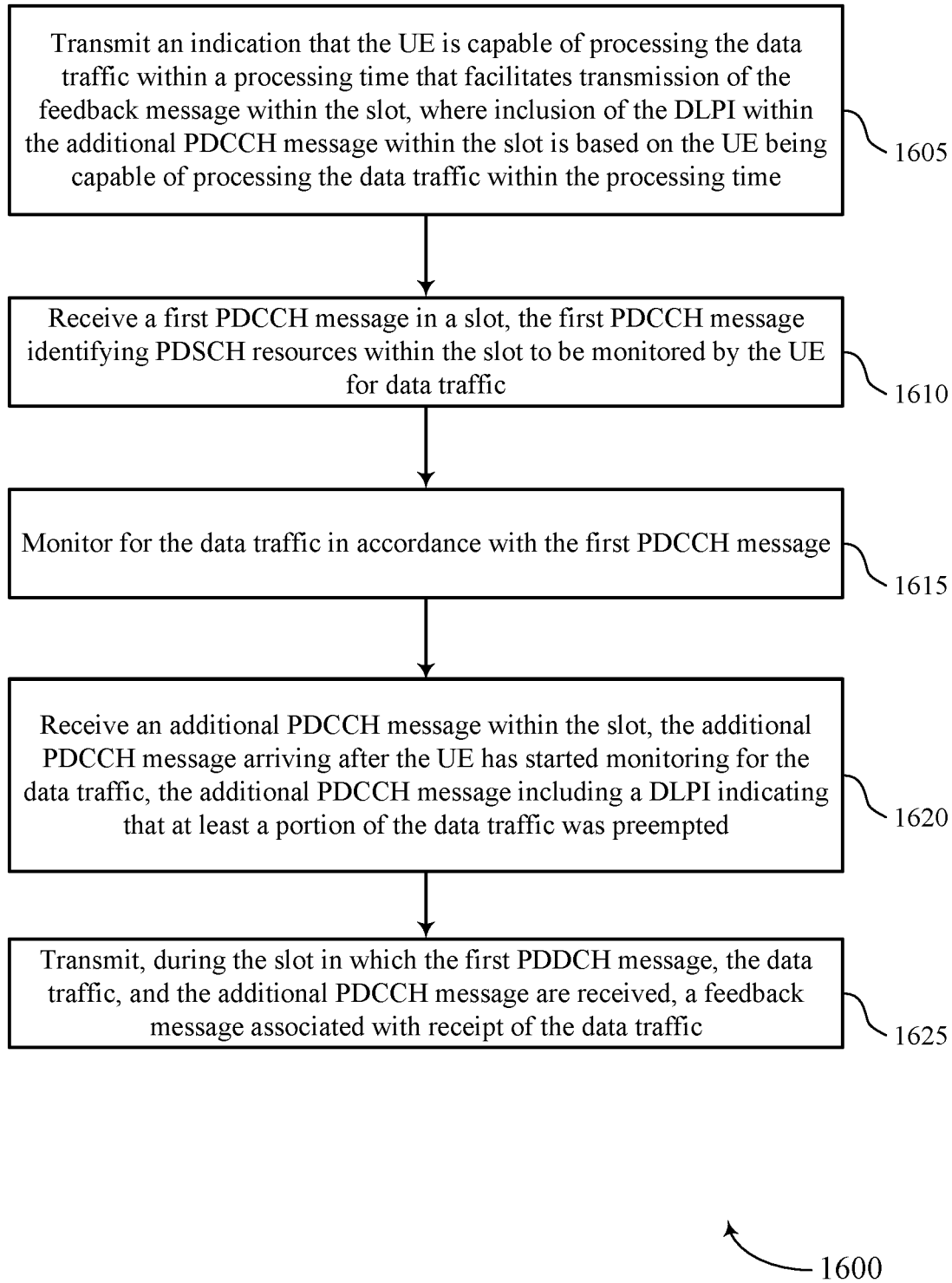

FIG. 16 shows a flowchart illustrating a method 1600 that supports subslot PDCCH monitoring and a DLPI in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may transmit an indication that the UE is capable of processing the data traffic within a processing time that facilitates transmission of the feedback message within the slot, where inclusion of the DLPI within an additional PDCCH message within the slot is based on the UE being capable of processing the data traffic within the processing time. The operations of 1605 may be performed according to the methods described herein. In some examples, aspects of the operations of 1605 may be performed by a processing capability component as described with reference to FIGS. 7 through 10.

At 1610, the UE may receive a first PDCCH message in a slot, the first PDCCH message identifying PDSCH resources within the slot to be monitored by the UE for data traffic. The operations of 1610 may be performed according to the methods described herein. In some examples, aspects of the operations of 1610 may be performed by a PDCCH receiver as described with reference to FIGS. 7 through 10.

At 1615, the UE may monitor for the data traffic in accordance with the first PDCCH message. The operations of 1615 may be performed according to the methods described herein. In some examples, aspects of the operations of 1615 may be performed by a data monitoring component as described with reference to FIGS. 7 through 10.

At 1620, the UE may receive an additional PDCCH message within the slot, the additional PDCCH message arriving after the UE has started monitoring for the data traffic, the additional PDCCH message including a DLPI indicating that at least a portion of the data traffic was preempted. The operations of 1620 may be performed according to the methods described herein. In some examples, aspects of the operations of 1620 may be performed by a DLPI receiver as described with reference to FIGS. 7 through 10.

At 1625, the UE may transmit, during the slot in which the first PDDCH message, the data traffic, and the additional PDCCH message are received, a feedback message associated with receipt of the data traffic. The operations of 1625 may be performed according to the methods described herein. In some examples, aspects of the operations of 1625 may be performed by a feedback transmitter as described with reference to FIGS. 7 through 10.

Figure 17:
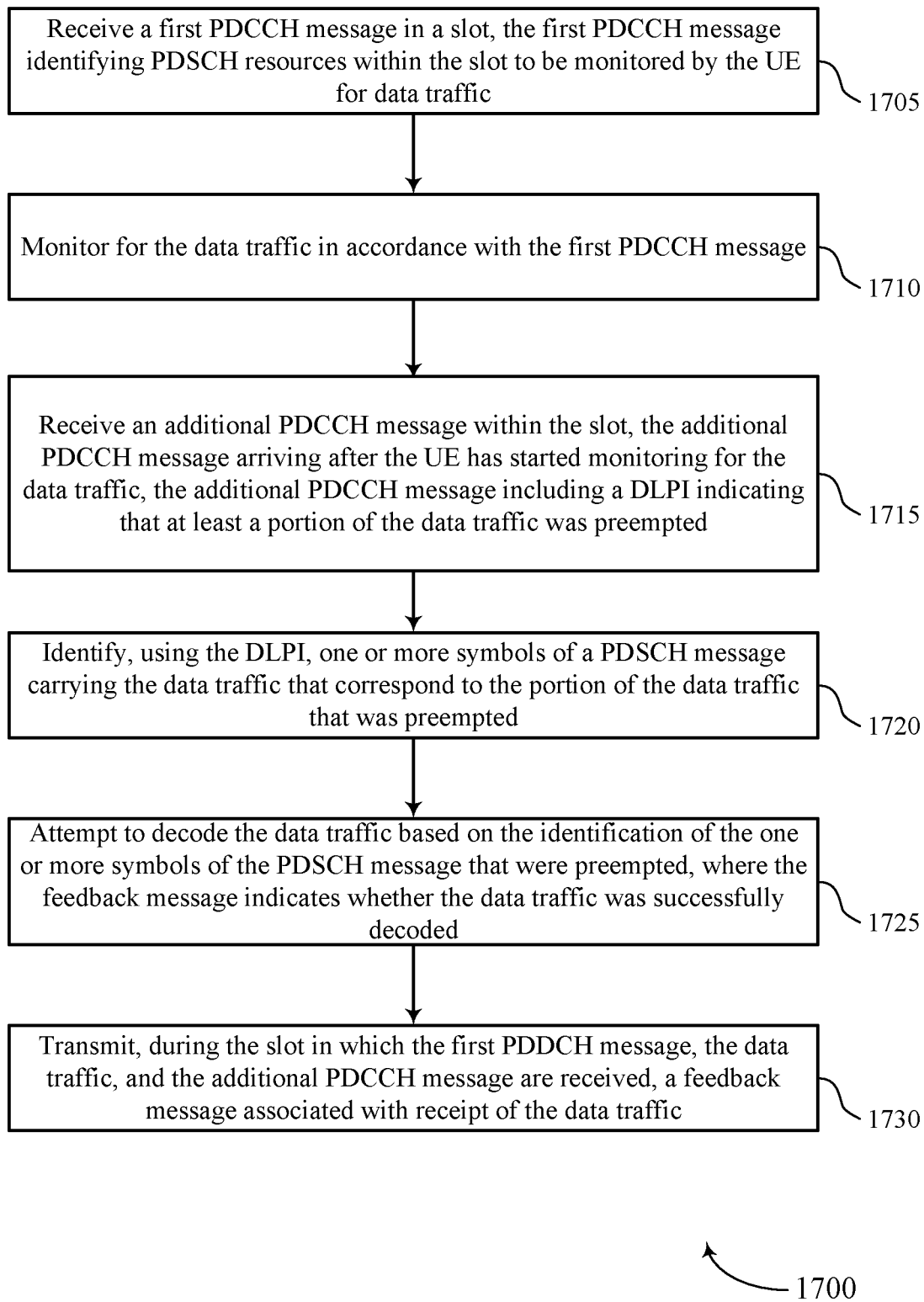

FIG. 17 shows a flowchart illustrating a method 1700 that supports subslot PDCCH monitoring and a DLPI in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a first PDCCH message in a slot, the first PDCCH message identifying PDSCH resources within the slot to be monitored by the UE for data traffic. The operations of 1705 may be performed according to the methods described herein. In some examples, aspects of the operations of 1705 may be performed by a PDCCH receiver as described with reference to FIGS. 7 through 10.

At 1710, the UE may monitor for the data traffic in accordance with the first PDCCH message. The operations of 1710 may be performed according to the methods described herein. In some examples, aspects of the operations of 1710 may be performed by a data monitoring component as described with reference to FIGS. 7 through 10.

At 1715, the UE may receive an additional PDCCH message within the slot, the additional PDCCH message arriving after the UE has started monitoring for the data traffic, the additional PDCCH message including a DLPI indicating that at least a portion of the data traffic was preempted. The operations of 1715 may be performed according to the methods described herein. In some examples, aspects of the operations of 1715 may be performed by a DLPI receiver as described with reference to FIGS. 7 through 10.

At 1720, the UE may identify, using the DLPI, one or more symbols of a PDSCH message carrying the data traffic that correspond to the portion of the data traffic that was preempted. The operations of 1720 may be performed according to the methods described herein. In some examples, aspects of the operations of 1720 may be performed by a data decoder as described with reference to FIGS. 7 through 10.

At 1725, the UE may attempt to decode the data traffic based on the identification of the one or more symbols of the PDSCH message that were preempted, where the feedback message indicates whether the data traffic was successfully decoded. The operations of 1725 may be performed according to the methods described herein. In some examples, aspects of the operations of 1725 may be performed by a data decoder as described with reference to FIGS. 7 through 10.

At 1730, the UE may transmit, during the slot in which the first PDDCH message, the data traffic, and the additional PDCCH message are received, a feedback message associated with receipt of the data traffic. The operations of 1730 may be performed according to the methods described herein. In some examples, aspects of the operations of 1730 may be performed by a feedback transmitter as described with reference to FIGS. 7 through 10.

Figure 18:
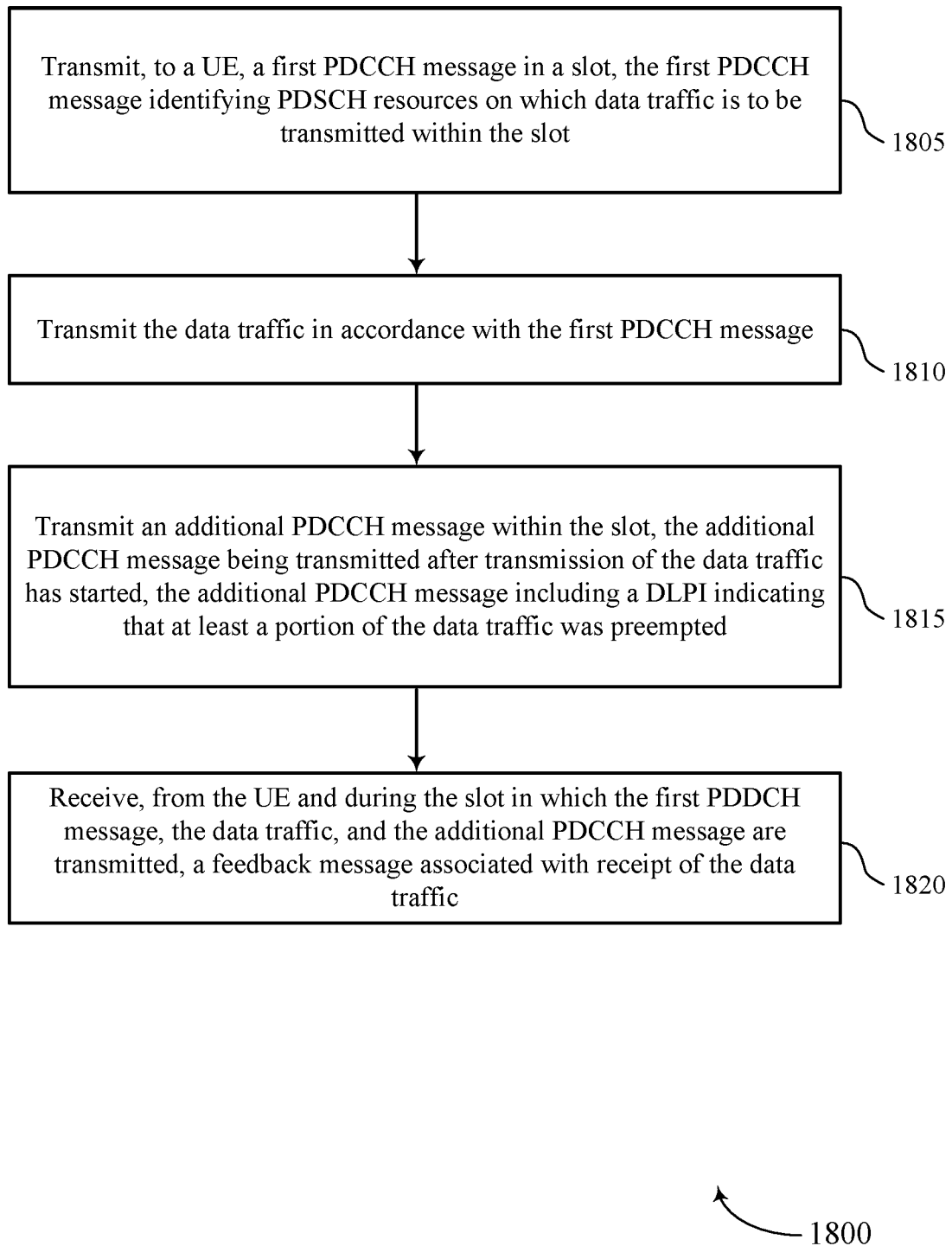

FIG. 18 shows a flowchart illustrating a method 1800 that supports subslot PDCCH monitoring and a DLPI in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a first PDCCH message in a slot, the first PDCCH message identifying PDSCH resources on which data traffic is to be transmitted within the slot. The operations of 1805 may be performed according to the methods described herein. In some examples, aspects of the operations of 1805 may be performed by a PDCCH transmitter as described with reference to FIGS. 11 through 14.

At 1810, the base station may transmit the data traffic in accordance with the first PDCCH message. The operations of 1810 may be performed according to the methods described herein. In some examples, aspects of the operations of 1810 may be performed by a data traffic component as described with reference to FIGS. 11 through 14.

At 1815, the base station may transmit an additional PDCCH message within the slot, the additional PDCCH message being transmitted after transmission of the data traffic has started, the additional PDCCH message including a DLPI indicating that at least a portion of the data traffic was preempted. The operations of 1815 may be performed according to the methods described herein. In some examples, aspects of the operations of 1815 may be performed by a DLPI transmitter as described with reference to FIGS. 11 through 14.

At 1820, the base station may receive, from the UE and during the slot in which the first PDDCH message, the data traffic, and the additional PDCCH message are transmitted, a feedback message associated with receipt of the data traffic. The operations of 1820 may be performed according to the methods described herein. In some examples, aspects of the operations of 1820 may be performed by a feedback receiver as described with reference to FIGS. 11 through 14.

Figure 19:
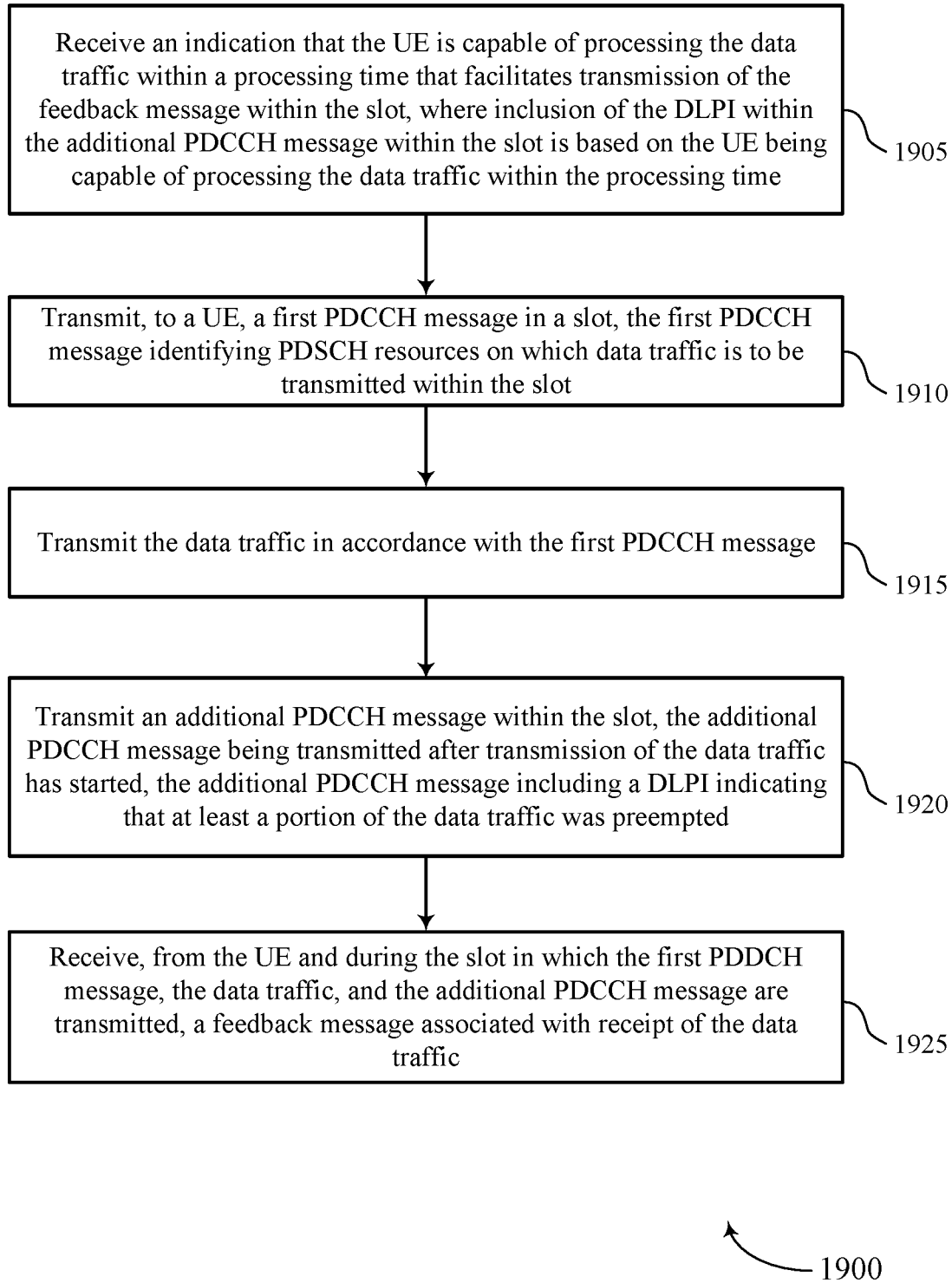

FIG. 19 shows a flowchart illustrating a method 1900 that supports subslot PDCCH monitoring and a DLPI in accordance with aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may receive an indication that the UE is capable of processing the data traffic within a processing time that facilitates transmission of the feedback message within the slot, where inclusion of the DLPI within an additional PDCCH message within the slot is based on the UE being capable of processing the data traffic within the processing time. The operations of 1905 may be performed according to the methods described herein. In some examples, aspects of the operations of 1905 may be performed by a processing capability receiver as described with reference to FIGS. 11 through 14.

At 1910, the base station may transmit, to a UE, a first PDCCH message in a slot, the first PDCCH message identifying PDSCH resources on which data traffic is to be transmitted within the slot. The operations of 1910 may be performed according to the methods described herein. In some examples, aspects of the operations of 1910 may be performed by a PDCCH transmitter as described with reference to FIGS. 11 through 14.

At 1915, the base station may transmit the data traffic in accordance with the first PDCCH message. The operations of 1915 may be performed according to the methods described herein. In some examples, aspects of the operations of 1915 may be performed by a data traffic component as described with reference to FIGS. 11 through 14.

At 1920, the base station may transmit an additional PDCCH message within the slot, the additional PDCCH message being transmitted after transmission of the data traffic has started, the additional PDCCH message including a DLPI indicating that at least a portion of the data traffic was preempted. The operations of 1920 may be performed according to the methods described herein. In some examples, aspects of the operations of 1920 may be performed by a DLPI transmitter as described with reference to FIGS. 11 through 14.

At 1925, the base station may receive, from the UE and during the slot in which the first PDDCH message, the data traffic, and the additional PDCCH message are transmitted, a feedback message associated with receipt of the data traffic. The operations of 1925 may be performed according to the methods described herein. In some examples, aspects of the operations of 1925 may be performed by a feedback receiver as described with reference to FIGS. 11 through 14.

Figure 20:
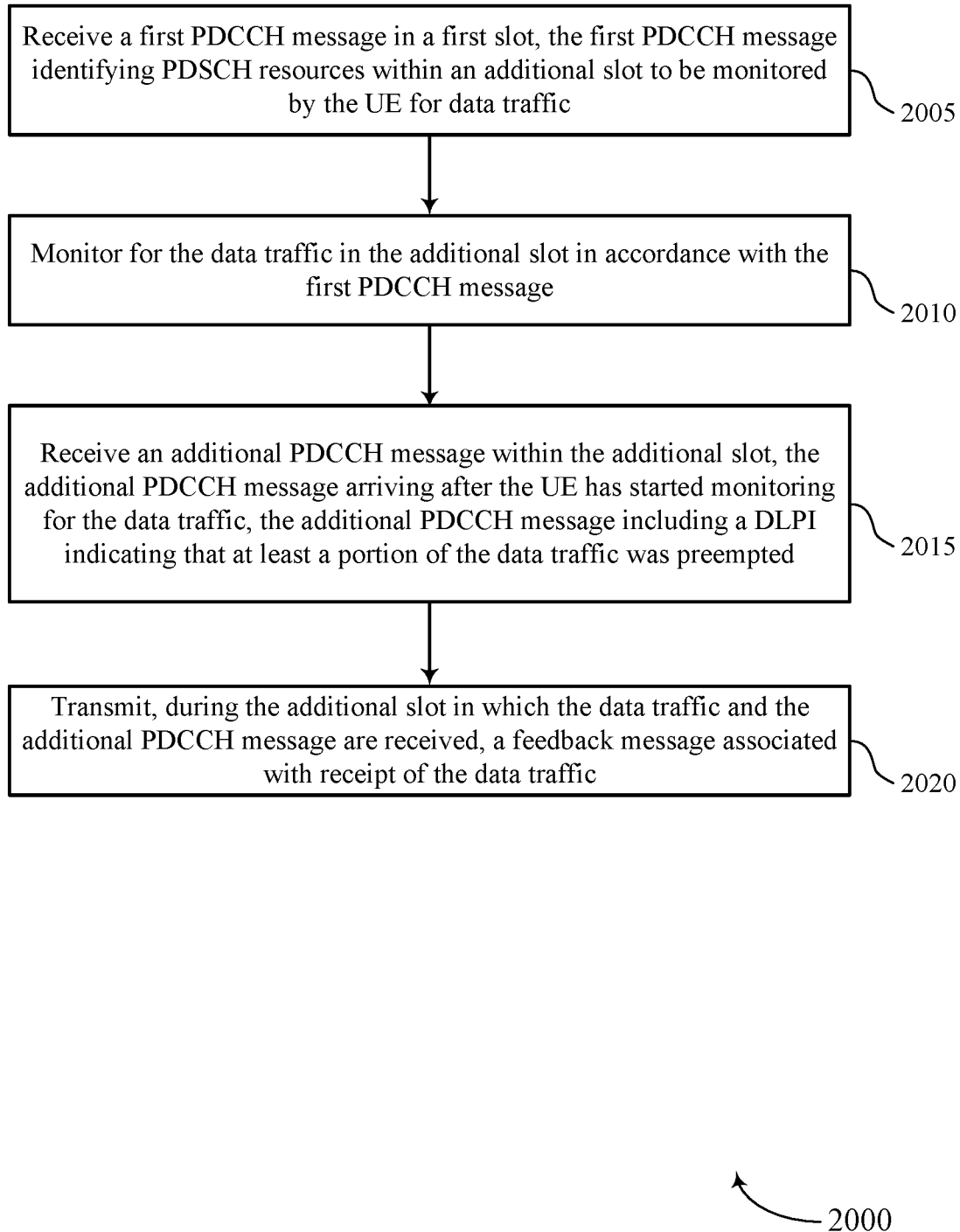

FIG. 20 shows a flowchart illustrating a method 2000 that supports subslot PDCCH monitoring and a DLPI in accordance with aspects of the present disclosure. The operations of method 2000 may be implemented by a UE 115 or its components as described herein. For example, the operations of method 2000 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2005, the UE may receive a first PDCCH message in a first slot, the first PDCCH message identifying PDSCH resources within an additional slot to be monitored by the UE for data traffic. The operations of 2005 may be performed according to the methods described herein. In some examples, aspects of the operations of 2005 may be performed by a PDCCH receiver as described with reference to FIGS. 7 through 10.

At 2010, the UE may monitor for the data traffic in the additional slot in accordance with the first PDCCH message. The operations of 2010 may be performed according to the methods described herein. In some examples, aspects of the operations of 2010 may be performed by a data monitoring component as described with reference to FIGS. 7 through 10.

At 2015, the UE may receive an additional PDCCH message within the additional slot, the additional PDCCH message arriving after the UE has started monitoring for the data traffic, the additional PDCCH message including a DLPI indicating that at least a portion of the data traffic was preempted. The operations of 2015 may be performed according to the methods described herein. In some examples, aspects of the operations of 2015 may be performed by a DLPI receiver as described with reference to FIGS. 7 through 10.

At 2020, the UE may transmit, during the additional slot in which the data traffic and the additional PDCCH message are received, a feedback message associated with receipt of the data traffic. The operations of 2020 may be performed according to the methods described herein. In some examples, aspects of the operations of 2020 may be performed by a feedback transmitter as described with reference to FIGS. 7 through 10.

Figure 21:
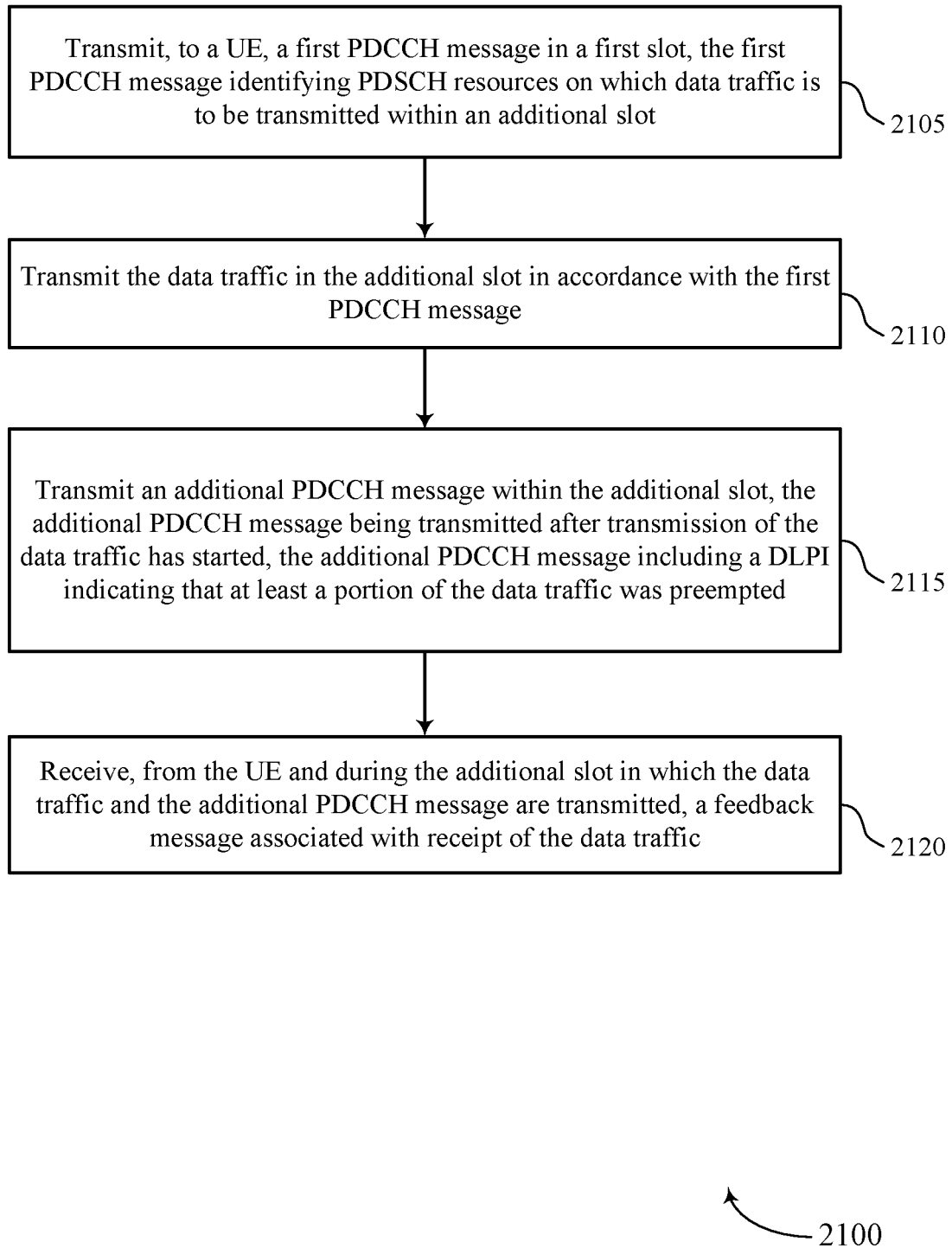

FIG. 21 shows a flowchart illustrating a method 2100 that supports subslot PDCCH monitoring and a DLPI in accordance with aspects of the present disclosure. The operations of method 2100 may be implemented by a base station 105 or its components as described herein. For example, the operations of method 2100 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a first PDCCH message in a first slot, the first PDCCH message identifying PDSCH resources on which data traffic is to be transmitted within an additional slot. The operations of 2105 may be performed according to the methods described herein. In some examples, aspects of the operations of 2105 may be performed by a PDCCH transmitter as described with reference to FIGS. 11 through 14.

At 2110, the base station may transmit the data traffic in the additional slot in accordance with the first PDCCH message. The operations of 2110 may be performed according to the methods described herein. In some examples, aspects of the operations of 2110 may be performed by a data traffic component as described with reference to FIGS. 11 through 14.

At 2115, the base station may transmit an additional PDCCH message within the additional slot, the additional PDCCH message being transmitted after transmission of the data traffic has started, the additional PDCCH message including a DLPI indicating that at least a portion of the data traffic was preempted. The operations of 2115 may be performed according to the methods described herein. In some examples, aspects of the operations of 2115 may be performed by a DLPI transmitter as described with reference to FIGS. 11 through 14.

At 2120, the base station may receive, from the UE and during the additional slot in which the data traffic and the additional PDCCH message are transmitted, a feedback message associated with receipt of the data traffic. The operations of 2120 may be performed according to the methods described herein. In some examples, aspects of the operations of 2120 may be performed by a feedback receiver as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving a first physical downlink control channel (PDCCH) message in a slot, the first PDCCH message identifying physical downlink shared channel (PDSCH) resources within the slot to be monitored by the UE for data traffic;

monitoring for the data traffic in accordance with the first PDCCH message;

identifying that the UE is to monitor the slot for an additional PDCCH message in accordance with a PDCCH monitoring configuration that indicates more than one PDCCH message monitoring occasions in non-consecutive symbols of the slot;

receiving the additional PDCCH message within the slot, the additional PDCCH message arriving after the UE has started monitoring for the data traffic, the additional PDCCH message including a downlink preemption indication indicating that at least a portion of the data traffic was preempted;
determining a feedback message associated with receipt of the data traffic and based at least in part on receipt of the downlink preemption indication; and
transmitting the feedback message.

2. The method of claim 1, further comprising:
transmitting an indication that the UE is capable of processing the data traffic within a processing time that facilitates transmission of the feedback message within the slot, wherein inclusion of the downlink preemption indication within the additional PDCCH message within the slot is based at least in part on the UE being capable of processing the data traffic within the processing time.

3. The method of claim 1, wherein identifying that the UE is to monitor the slot for the additional PDCCH message comprises:
receiving configurations of control resources sets, common search spaces, UE-specific search spaces, or a combination thereof via radio resource control (RRC) messaging, wherein the PDCCH monitoring configuration comprises resources indicated by the configurations of control resource sets, common search spaces, UE-specific search spaces, or the combination thereof.

4. The method of claim 1, wherein identifying that the UE is to monitor the slot for the additional PDCCH message comprises:
identifying, from the PDCCH monitoring configuration, that monitoring for the additional PDCCH message is to occur at a fixed time within the slot.

5. The method of claim 1, wherein identifying that the UE is to monitor the slot for the additional PDCCH message comprises:
identifying, from the PDCCH monitoring configuration, that monitoring for the additional PDCCH message is to occur a fixed time after a PDSCH message in which the data traffic is received.

6. The method of claim 1, further comprising:
identifying, using the downlink preemption indication, one or more symbols of a PDSCH message carrying the data traffic that correspond to the portion of the data traffic that was preempted; and
attempting to decode the data traffic based at least in part on the identification of the one or more symbols of the PDSCH message that were preempted, wherein the feedback message indicates whether the data traffic was successfully decoded.

7. The method of claim 6, wherein identifying the one or more symbols of the PDSCH message that were preempted comprises:
mapping bits of the downlink preemption indication to symbols and frequency resources of the PDSCH message.

8. The method of claim 7, wherein the downlink preemption indication includes fewer bits than symbols of the PDSCH message, wherein at least one bit of the downlink preemption indication maps to two or more symbols of the PDSCH message.

9. The method of claim 7, wherein the downlink preemption indication includes as many bits as symbols of the PDSCH message, but wherein each bit of the downlink preemption indication maps to two or more symbols of a subband of the PDSCH message, the PDSCH message including a corresponding two or more subbands.

10. The method of claim 1, wherein receiving the additional PDCCH message within the slot comprises:
receiving the additional PDCCH message while the UE is still monitoring for the data traffic.

11. The method of claim 1, further comprising:
receiving the data traffic via a first service, wherein the portion of the data traffic was preempted by a second service.

12. The method of claim 11, wherein the first service is enhanced mobile broadband (eMBB) traffic, and the second service is ultra-reliable low latency communication (URLLC) traffic.

13. A method for wireless communications at a user equipment (UE), comprising:
receiving a first physical downlink control channel (PDCCH) message in a first slot, the first PDCCH message identifying physical downlink shared channel (PDSCH) resources within an additional slot to be monitored by the UE for data traffic;
monitoring for the data traffic in the additional slot in accordance with the first PDCCH message;
identifying that the UE is to monitor the additional slot for an additional PDCCH message in accordance with a PDCCH monitoring configuration that indicates more than one PDCCH message monitoring occasions in non-consecutive symbols of the additional slot;
receiving the additional PDCCH message within the additional slot, the additional PDCCH message arriving after the UE has started monitoring for the data traffic, the additional PDCCH message including a downlink preemption indication indicating that at least a portion of the data traffic was preempted;
determining a feedback message associated with receipt of the data traffic and based at least in part on receipt of the downlink preemption indication; and
transmitting the feedback message.

14. The method of claim 13, further comprising:
transmitting an indication that the UE is capable of processing the data traffic within a processing time that facilitates transmission of the feedback message within the additional slot, wherein inclusion of the downlink preemption indication within the additional PDCCH message within the additional slot is based at least in part on the UE being capable of processing the data traffic within the processing time.

15. The method of claim 13, wherein identifying that the UE is to monitor the additional slot for the additional PDCCH message comprises:
receiving configurations of control resources sets, common search spaces, UE-specific search spaces, or a combination thereof via radio resource control (RRC) messaging, wherein the PDCCH monitoring configuration comprises resources indicated by the configurations of control resource sets, common search spaces, UE-specific search spaces, or the combination thereof.

16. The method of claim 13, wherein identifying that the UE is to monitor the additional slot for the additional PDCCH message comprises:
identifying, from the PDCCH monitoring configuration, that monitoring for the additional PDCCH message is to occur at a fixed time within the additional slot.

17. The method of claim 13, wherein identifying that the UE is to monitor the additional slot for the additional PDCCH message comprises:
identifying, from the PDCCH monitoring configuration, that monitoring for the additional PDCCH message is to occur at a fixed time within the additional slot.

18. The method of claim 13, further comprising:
identifying, using the downlink preemption indication, one or more symbols of a PDSCH message carrying the data traffic that correspond to the portion of the data traffic that was preempted; and
attempting to decode the data traffic based at least in part on the identification of the one or more symbols of the PDSCH message that were preempted, wherein the feedback message indicates whether the data traffic was successfully decoded.

19. The method of claim 18, wherein identifying the one or more symbols of the PDSCH message that were preempted comprises:
mapping bits of the downlink preemption indication to symbols and frequency resources of the PDSCH message.

20. The method of claim 19, wherein the downlink preemption indication includes fewer bits than symbols of the PDSCH message, wherein at least one bit of the downlink preemption indication maps to two or more symbols of the PDSCH message.

21. The method of claim 19, wherein the downlink preemption indication includes as many bits as symbols of the PDSCH message, but wherein each bit of the downlink preemption indication maps to two or more symbols of a subband of the PDSCH message, the PDSCH message including a corresponding two or more subbands.

22. The method of claim 13, wherein receiving the additional PDCCH message within the additional slot comprises:
receiving the additional PDCCH message while the UE is still monitoring for the data traffic.

23. The method of claim 13, further comprising:
receiving the data traffic via a first service, wherein the portion of the data traffic was preempted by a second service.

24. The method of claim 23, wherein the first service is enhanced mobile broadband (eMBB) traffic, and the second service is ultra-reliable low latency communication (URLLC) traffic.

25. An apparatus for wireless communication at a user equipment (UE), comprising:
a processor,
memory in electronic communication with the processor; and
instructions stored in the memory and executable by the processor to cause the apparatus to:
receive a first physical downlink control channel (PDCCH) message in a slot, the first PDCCH message identifying physical downlink shared channel (PDSCH) resources within the slot to be monitored by the UE for data traffic;
monitor for the data traffic in accordance with the first PDCCH message;
identify that the UE is to monitor the slot for an additional PDCCH message in accordance with a PDCCH monitoring configuration that indicates more than one PDCCH message monitoring occasions in non-consecutive symbols of the slot;
receive the additional PDCCH message within the slot, the additional PDCCH message arriving after the UE has started monitoring for the data traffic, the additional PDCCH message including a downlink preemption indication indicating that at least a portion of the data traffic was preempted;
determine a feedback message associated with receipt of the data traffic and based at least in part on receipt of the downlink preemption indication; and
transmit the feedback message.

26. The apparatus of claim 25, wherein the instructions are further executable by the processor to cause the apparatus to:
transmit an indication that the UE is capable of processing the data traffic within a processing time that facilitates transmission of the feedback message within the slot, wherein inclusion of the downlink preemption indication within the additional PDCCH message within the slot is based at least in part on the UE being capable of processing the data traffic within the processing time.

27. An apparatus for wireless communications at a user equipment (UE), comprising:
a processor,
memory in electronic communication with the processor; and
instructions stored in the memory and executable by the processor to cause the apparatus to:
receive a first physical downlink control channel (PDCCH) message in a first slot, the first PDCCH message identifying physical downlink shared channel (PDSCH) resources within an additional slot to be monitored by the UE for data traffic;
monitor for the data traffic in the additional slot in accordance with the first PDCCH message;
identify that the UE is to monitor the additional slot for an additional PDCCH message in accordance with a PDCCH monitoring configuration that indicates more than one PDCCH message monitoring occasions in non-consecutive symbols of the additional slot;
receive the additional PDCCH message within the additional slot, the additional PDCCH message arriving after the UE has started monitoring for the data traffic, the additional PDCCH message including a downlink preemption indication indicating that at least a portion of the data traffic was preempted;
determine a feedback message associated with receipt of the data traffic and based at least in part on receipt of the downlink preemption indication; and
transmit the feedback message during the additional slot in which the data traffic and the additional PDCCH message are received.

28. The apparatus of claim 27, wherein the instructions are further executable by the processor to cause the apparatus to:
transmit an indication that the UE is capable of processing the data traffic within a processing time that facilitates transmission of the feedback message within the additional slot, wherein inclusion of the downlink preemption indication within the additional PDCCH message within the additional slot is based at least in part on the UE being capable of processing the data traffic within the processing time.

29. The method of claim 1, wherein transmitting the feedback message comprises:
transmitting the feedback message during the slot in which the first PDCCH message, the data traffic, and the additional PDCCH message are received.

30. The method of claim 13, wherein transmitting the feedback message comprises:

transmitting the feedback message during the additional slot in which the data traffic and the additional PDCCH message are received.

* * * * *